(12) United States Patent
Ricci

(10) Patent No.: US 9,297,662 B2
(45) Date of Patent: *Mar. 29, 2016

(54) UNIVERSAL BUS IN THE CAR

(71) Applicant: AutoConnect Holdings LLC, Wellesley, MA (US)

(72) Inventor: Christopher P. Ricci, Saratoga, CA (US)

(73) Assignee: AutoConnect Holdings LLC, Wellesley, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,255

(22) Filed: Mar. 16, 2015

(65) Prior Publication Data

US 2015/0193007 A1  Jul. 9, 2015

Related U.S. Application Data

(63) Continuation of application No. 13/679,441, filed on Nov. 16, 2012, now Pat. No. 8,983,718.

(60) Provisional application No. 61/560,509, filed on Nov. 16, 2011, provisional application No. 61/637,164, filed on Apr. 23, 2012, provisional application No. 61/646,747, filed on May 14, 2012, provisional application No. 61/653,275, filed on May 30, 2012, provisional application No. 61/653,264, filed on May 30, 2012, provisional application No. 61/653,563, filed on May 31, 2012, provisional application No. 61/663,335, filed on Jun. 22, 2012, provisional application No. 61/672,483, filed on Jul. 17, 2012, provisional application No. 61/714,016, filed on Oct. 15, 2012, provisional application No. 61/715,699, filed on Oct. 18, 2012.

(51) Int. Cl.
*G06F 17/00* (2006.01)
*G01C 21/20* (2006.01)
*G06F 9/54* (2006.01)
(Continued)

(52) U.S. Cl.
CPC ............... *G01C 21/20* (2013.01); *B60K 35/00* (2013.01); *B60K 37/02* (2013.01); *B60R 7/04* (2013.01); *B60R 16/037* (2013.01); *B60W 30/182* (2013.01); *G06F 3/017* (2013.01); *G06F 3/0484* (2013.01); *G06F 3/0488* (2013.01); *G06F 9/54* (2013.01); *G06F 13/14* (2013.01); *G06F 13/364* (2013.01); *G06F 17/00* (2013.01); *G06F 17/30386* (2013.01); *G06F 21/10* (2013.01); *G06N 5/02* (2013.01); *G06Q 30/0265* (2013.01); *G06Q 40/08* (2013.01); *G08C 19/00* (2013.01); *G08G 1/017* (2013.01); *G08G 1/096791* (2013.01); *G08G 1/143* (2013.01); *G08G 1/16* (2013.01); *H04L 67/02* (2013.01); *H04N 21/482* (2013.01); *H04W 4/001* (2013.01); *H04W 4/046* (2013.01); *H04W 84/005* (2013.01); *B60W 2040/0872* (2013.01);

(Continued)

(58) Field of Classification Search
CPC .............................. G06F 3/017; B60R 16/037
USPC ........ 701/1, 2, 36, 436, 450, 487, 488; 705/1, 705/13, 15, 27; 715/863
See application file for complete search history.

(56) References Cited

U.S. PATENT DOCUMENTS 6,724,920 B1 * 4/2004 Berenz et al. ................. 382/118
RE41,449 E * 7/2010 Krahnstoever et al. ........... 701/1

(Continued)

*Primary Examiner* — Richard Camby
(74) *Attorney, Agent, or Firm* — Sheridan Ross P.C.

(57) ABSTRACT

Methods and systems for a complete vehicle ecosystem are provided. Specifically, systems that when taken alone, or together, provide an individual or group of individuals with an intuitive and comfortable vehicular environment. The present disclosure includes a system to recognize the drivers and/or passengers within the automobile. Based on the recognition, the vehicle may change a configuration of the automobile to match predetermined preferences for the driver and/or passenger. The configurations may also include the recognition of a unique set of gestures for the person. Further, the configuration can also include the tracking of health data related to the person.

20 Claims, 20 Drawing Sheets

(51) Int. Cl.
    *B60R 7/04* (2006.01)
    *G08C 19/00* (2006.01)
    *G06N 5/02* (2006.01)
    *H04L 29/08* (2006.01)
    *G08G 1/14* (2006.01)
    *H04W 84/00* (2009.01)
    *H04W 4/00* (2009.01)
    *H04W 4/04* (2009.01)
    *G06Q 40/08* (2012.01)
    *G06F 17/30* (2006.01)
    *G06F 3/0484* (2013.01)
    *G08G 1/16* (2006.01)
    *G06F 13/364* (2006.01)
    *H04N 21/482* (2011.01)
    *G06F 21/10* (2013.01)
    *G08G 1/0967* (2006.01)
    *G06Q 30/02* (2012.01)
    *G06F 13/14* (2006.01)
    *B60R 16/037* (2006.01)
    *B60W 30/182* (2012.01)
    *B60K 35/00* (2006.01)
    *B60K 37/02* (2006.01)
    *G06F 3/01* (2006.01)
    *G06F 3/0488* (2013.01)
    *G08G 1/017* (2006.01)
    *B60W 40/08* (2012.01)
    *B60W 50/00* (2006.01)

(52) U.S. Cl.
    CPC ... *B60W 2050/0095* (2013.01); *B60W 2540/22* (2013.01); *B60W 2540/26* (2013.01); *B60W 2540/28* (2013.01)

(56) References Cited

U.S. PATENT DOCUMENTS

2008/0253613 A1* 10/2008 Jones et al. .................... 382/103
2009/0180668 A1* 7/2009 Jones et al. .................... 382/103
2010/0295676 A1* 11/2010 Khachaturov et al. ........ 340/540

\* cited by examiner

Tap

Long Press

Drag

Flick

Pinch

Spread

UNIVERSAL BUS IN THE CAR

CROSS REFERENCE TO RELATED APPLICATIONS

The present application is a continuation of U.S. patent application Ser. No. 13/679,441, filed Nov. 16, 2012, which claims the benefits of and priority, under 35 U.S.C. §119(e), to U.S. Provisional Application Ser. No. 61/560,509, filed on Nov. 16, 2011, entitled "Complete Vehicle Ecosystem;" 61/637,164, filed on Apr. 23, 2012, entitled "Complete Vehicle Ecosystem;" 61/646,747, filed on May 14, 2012, entitled "Branding of Electrically Propelled Vehicles Via the Generation of Specific Operating Sounds;" 61/653,275, filed on May 30, 2012, entitled "Vehicle Application Store for Console;" 61/653,264, filed on May 30, 2012, entitled "Control of Device Features Based on Vehicle State;" 61/653,563, filed on May 31, 2012, entitled "Complete Vehicle Ecosystem;" 61/663,335, filed on Jun. 22, 2012, entitled "Complete Vehicle Ecosystem;" 61/672,483, filed on Jul. 17, 2012, entitled "Vehicle Climate Control;" 61/714,016, filed on Oct. 15, 2012, entitled "Vehicle Middleware;" and 61/715,699, filed Oct. 18, 2012, entitled "Vehicle Middleware." The entire disclosures of the applications listed above are hereby incorporated by reference, in their entirety, for all that they teach and for all purposes.

This application is also related to U.S. patent application Ser. No. 13/420,236, filed on Mar. 14, 2012, entitled, "Configurable Vehicle Console;" Ser. No. 13/420,240, filed on Mar. 14, 2012, entitled "Removable, Configurable Vehicle Console;" Ser. No. 13/462,593, filed on May 2, 2012, entitled "Configurable Dash Display;" Ser. No. 13/462,596, filed on May 2, 2012, entitled "Configurable Heads-Up Dash Display;" Ser. No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,412 filed on Nov. 16, 2012, entitled "Vehicle Application Store for Console"; Ser. No. 13/679,857, filed on Nov. 16, 2012, entitled "Sharing Applications/Media Between Car and Phone (Hydroid)"; Ser. No. 13/679,878, filed on Nov. 16, 2012, entitled "In-Cloud Connection for Car Multimedia"; Ser. No. 13/679,875, filed on Nov. 16, 2012, entitled "Music Streaming"; Ser. No. 13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,699, filed on Nov. 16, 2012, entitled "Etiquette Suggestion"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No. 13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/679,443, filed on Nov. 16, 2012, entitled "Method and System for Maintaining and Reporting Vehicle Occupant Information"; Ser. No. 13/678,762, filed on Nov. 16, 2012, entitled "Behavioral Tracking and Vehicle Applications"; Ser. No. 13/679,292, filed Nov. 16, 2012, entitled "Branding of Electrically Propelled Vehicles Via the Generation of Specific Operating Output"; Ser. No. 13/679,400, filed Nov. 16, 2012, entitled "Vehicle Climate Control"; Ser. No. 13/840,240, filed on Mar. 15, 2013, entitled "Controller Area Network Bus"; Ser. No. 13/678,773, filed on Nov. 16, 2012, entitled "Location Information Exchange Between Vehicle and Device"; Ser. No. 13/679,887, filed on Nov. 16, 2012, entitled "In Car Communication Between Devices"; Ser. No. 13/679,842, filed on Nov. 16, 2012, entitled "Configurable Hardware Unit for Car Systems"; Ser. No. 13/679,204, filed on Nov. 16, 2012, entitled "Feature Recognition for Configuring a Vehicle Console and Associated Devices"; Ser. No. 13/679,350, filed on Nov. 16, 2012, entitled "Configurable Vehicle Console"; Ser. No. 13/679,358, filed on Nov. 16, 2012, entitled "Configurable Dash Display"; Ser. No. 13/679,363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

BACKGROUND

Whether using private, commercial, or public transport, the movement of people and/or cargo has become a major industry. In today's interconnected world daily travel is essential to engaging in commerce. Commuting to and from work can account for a large portion of a traveler's day. As a result, vehicle manufacturers have begun to focus on making this commute, and other journeys, more enjoyable and easier.

Currently, vehicle manufacturers attempt to entice travelers to use a specific conveyance based on any number of features. Most of these features focus on vehicle safety or efficiency. From the addition of safety-restraints, air-bags, and warning systems to more efficient engines, motors, and designs, the vehicle industry has worked to appease the supposed needs of the traveler. Recently, however, vehicle manufactures have shifted their focus to user and passenger comfort as a primary concern. Making an individual more comfortable while traveling instills confidence and pleasure in using a given vehicle and increases an individual's preference for a given manufacturer and/or vehicle type.

One way to instill comfort in a vehicle is to create an environment within the vehicle similar to that of an individual's home. Integrating features in a vehicle that are associated with comfort found in an individual's home can ease a traveler's transition from home to vehicle. Several manufacturers have added comfort features in vehicles such as the following: leather seats, adaptive and/or personal climate control systems, music and media players, ergonomic controls, Internet connectivity, etc. However, because these manufacturers have added features to a conveyance, they have built comfort around a vehicle and failed to build a vehicle around comfort. Thus, the vehicle as an ecosystem has not been fully considered.

SUMMARY

There is a need for a vehicle ecosystem that can integrate both physical and mental comforts while seamlessly operating with current electronic devices to result in a totally intuitive and immersive user experience. These and other needs are addressed by the various aspects, embodiments, and/or configurations of the present disclosure. Also, while the disclosure is presented in terms of exemplary embodiments, it should be appreciated that individual aspects of the disclosure can be separately claimed.

The present disclosure can provide a number of advantages depending on the particular aspect, embodiment, and/or configuration. Currently, the vehicle industry is dominated by conveyances offering a separate comfort experience from a home, work, or other aspect of a traveler's life. Unfortunately, current vehicles include a series of separate devices that work together while an individual or individuals are associated with the vehicle. Technology areas and devices such as user interfaces, applications, tracking capabilities, hardware, and/or location-based communications, could be combined together, or used separately, to form a complete vehicle ecosystem. This ecosystem can provide a connected and intuitive user experience for any traveler.

A series of devices associated with a vehicle along with other devices can form a complete and familiar user experience. In particular, the devices, applications, interfaces, hardware, and software may combine to form a user-friendly environment while traveling or otherwise moving from one location to another and/or when a vehicle is at rest. Moreover, aspects of the present disclosure may provide communication between the vehicle and a user at any given time. Specifically, communication between a vehicle and another device may also relay information to an individual and/or group of individuals. This communication between a vehicle and at least one other device may include, but is not limited to, communication between a vehicle and: 1) at least one mobile device, 2) at least one other vehicle, 3) another system/group of devices, 4) a non-mobile device, and 5) combinations thereof. These and other advantages will be apparent from the disclosure.

The term "ecosystem" or "vehicle ecosystem," as used herein, refers to a community of person(s) in conjunction with the vehicle or other device components of their environment (for example, climate control, safety features, mobile devices, multimedia sources etc.), interacting as a system.

The term "environment" or "vehicle environment," as used herein, refers to the surroundings or conditions in which a person operates a vehicle.

The term "sensor," as used herein, refers to a converter or instrument that measures a physical quantity or quality and converts the measurement into a signal which can be read, observed, stored, and/or understood by an observer or by another instrument.

The term "stimulus," as used herein, refers to some event or something external that influences an activity.

The term "automotive navigation system" is a satellite navigation system designed for use in automobiles. It typically uses a GPS navigation device to acquire position data to locate the user on a road in the unit's map database. Using the road database, the unit can give directions to other locations along roads also in its database. Dead reckoning using distance data from sensors attached to the drivetrain, a gyroscope and an accelerometer can be used for greater reliability, as GPS signal loss and/or multipath can occur due to urban canyons or tunnels.

The term "bus" and variations thereof, as used herein, refers to a subsystem that transfers information and/or data between various components. A bus generally refers to the collection communication hardware interface, interconnects, bus architecture, and/or protocol defining the communication scheme for a communication system and/or communication network. A bus may also be specifically refer to a part of a communication hardware that interfaces the communication hardware with the interconnects that connect to other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The terms "head unit," "dash," "dashboard," and variations thereof, as used herein, are used interchangeably and include any panel and/or area of a vehicle disposed adjacent to an operator, user, and/or passenger. Typical dashboards may include but are not limited to one or more control panel, instrument housing, head unit, indicator, gauge, meter, light, audio equipment, computer, screen, display, HUD unit, and graphical user interface.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "communication system" or "communication network" and variations thereof, as used herein, refers to a collection of communication components capable of one or more of transmission, relay, interconnect, control, or otherwise manipulate information or data from at least one transmitter to at least one receiver. As such, the communication may include a range of systems supporting point-to-point to broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e. an antenna) and running software capable of using the communication means to send a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity," as used herein, refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "desktop," as used herein, refers to a metaphor used to portray systems. A desktop is generally considered a "surface" that typically includes pictures, called icons, widgets, folders, etc. that can activate show applications, windows, cabinets, files, folders, documents, and other graphical items. The icons are generally selectable to initiate a task through user interface interaction to allow a user to execute applications or conduct other operations.

The term "display," as used herein, refers to a portion of a screen used to display the output of a computer to a user.

The term "displayed image," as used herein, refers to an image produced on the display. A typical displayed image is a window or desktop. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical. The multi-screen display can have one composite display that encompasses all the screens. The composite display can have different display characteristics based on the various orientations of the device.

The term "gesture," as used herein, refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "module," as used herein, refers to any known or later developed hardware, software, firmware, artificial intelligence, fuzzy logic, or combination of hardware and software that is capable of performing the functionality associated with that element.

The term "gesture recognition" or "gesture capture," as used herein, refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

A "multi-screen application," as used herein, refers to an application that is capable of producing one or more windows that may simultaneously occupy multiple screens. A multi-screen application commonly can operate in single-screen mode in which one or more windows of the application are displayed only on one screen or in multi-screen mode in which one or more windows are displayed simultaneously on multiple screens.

A "single-screen application," as used herein, refers to an application that is capable of producing one or more windows that may occupy only a single screen at a time.

The term "screen," "touch screen," or "touchscreen," as used herein, refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "window" refers to a, typically rectangular, displayed image on at least part of a display that contains or provides content different from the rest of the screen. The window may obscure the desktop.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a complete vehicle ecosystem. The ecosystem can comprise single devices or a compilation of devices. This device, or these devices, may be capable of communicating with other devices and/or to an individual or group of individuals. Further, this device, or these devices, can receive user input in unique ways. The overall design and functionality of each device provides for an enhanced user experience making the device more useful and more efficient. As described herein, the device(s) may be electrical, mechanical, electro-mechanical, software-based, and/or combinations thereof.

Figure 1:
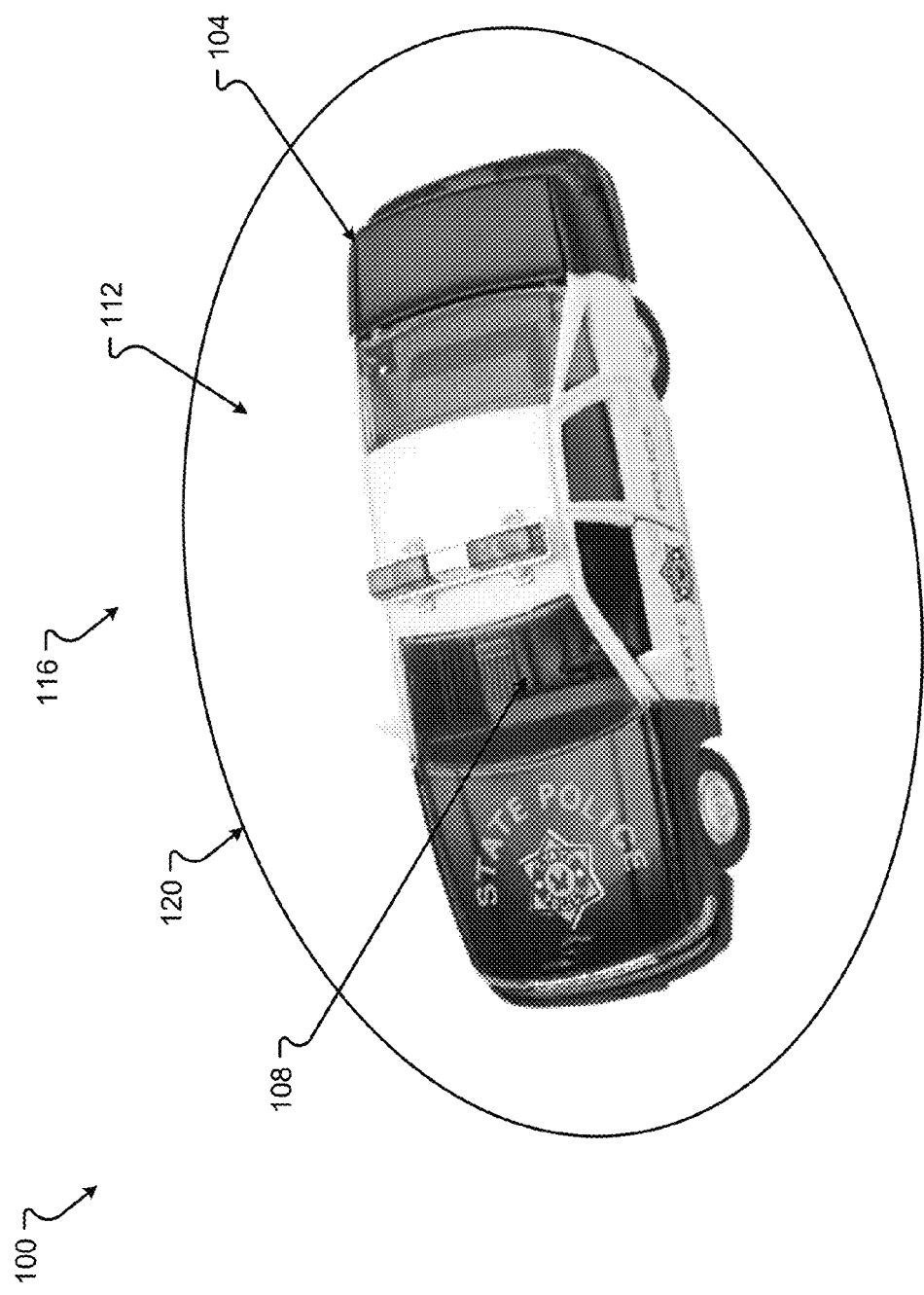
FIG. 1 depicts an embodiment of a vehicle operating environment.

A vehicle environment 100 that may contain a vehicle ecosystem is shown in FIG. 1. The vehicle environment 100 can contain areas associated with a vehicle or conveyance 104. The vehicle 104 is shown as a police car but can be any type of conveyance. The environment 100 can include at least three zones. A first zone 108 may be inside a vehicle 104. The zone 108 includes any interior space, trunk space, engine compartment, or other associated space within or associated with the vehicle 104. The interior environment 108 can be defined by one or more techniques, for example, geo-fencing.

A second zone 112 may be delineated by line 120. The zone 112 is created by a range of one or more sensors associated with the vehicle 104. Thus, the area 112 is exemplary of the range of those sensors and what can be detected by those sensors associated with the vehicle 104. The rest of the environment includes all space beyond the range of the sensors and is represented by 116. Thus, the environment 100 may have an area 116 that includes all areas beyond the sensor range 112. The area 116 may include future locations of travel that the vehicle 104 may proceed to in the future.

Figure 2:
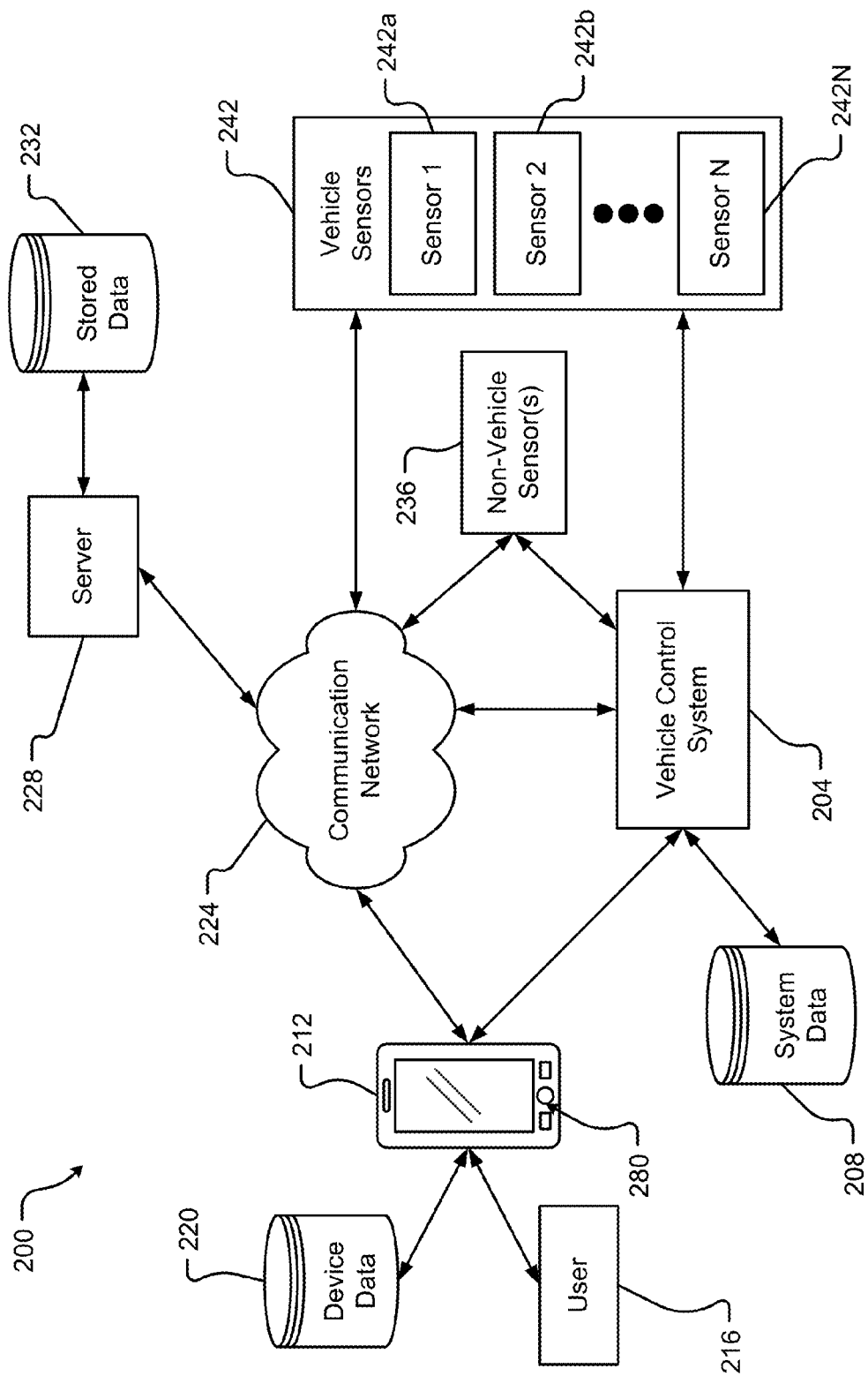
FIG. 2 is a block diagram of an embodiment of a vehicle system.

An embodiment of a vehicle system 200 is shown in FIG. 2. The vehicle system 200 may consist of hardware and/or software that conduct various operations for or with the vehicle 104. The operations can include, but are not limited to providing information to the user, receiving input from the user, and controlling the functions or operation of the vehicle 104, etc. The vehicle system 200 can include a vehicle control system 204. The vehicle control system 204 can be any type of computing system operable to conduct the operations as described herein.

The vehicle control system 204 may interact with a memory or storage system 208 that stores system data. System data 208 may be any type of data needed for the vehicle control system 204 to control effectively the vehicle 104. An example of some of the data that may be stored by the vehicle control system 204 may be as described in conjunction with FIG. 8. The system data 208 can represent any type of database or other storage system. Thus, the system data 208 can be a flat file data system, an object-oriented data system, or some other data system that may interface with the vehicle control system 204.

The vehicle control system 204 may communicate with a device or user interface 212. The user interface 212 may be as described in conjunction with FIG. 5. The user interface 212 may be operable to receive user input either through touch input, on one or more user interface buttons, or through a graphical user interface that may include a gesture capture region, as described in conjunction with FIG. 5. Further, the symbol 212 can represent a device that is located or associated with the vehicle 104. The device 212 can be a mobile device, including, but not limited to, a mobile telephone, a mobile computer, or other type of computing system or device that is either permanently located in or temporarily associated with the automobile 104. Thus, the vehicle control system 204 can interface with the device 212 and leverage the devices computing capability to provide one or more of the features or functions as described herein.

The device or user interface 212 can receive input or provide information to a user 216. The user 216 may thus interact with the vehicle control system 204 through the interface or device 212. Further, the device 212 may include or have access to device data 220. The device data 220 can be any type of data that is used in conjunction with the device 212, including, but not limited to, multimedia data, preferences data, bioinformatics, data associated with the user 216, or other types of data. The data may be stored in a device data 220 as a storage system similar to that described in conjunction with system data 208.

The vehicle control system 204 may also communicate with or through a communication network 224. The communication network 224 can represent any type of wireless or wired communication system that may be included within the vehicle 104 or operable to communicate outside the vehicle 104. Thus, the communication network 224 can include a local area communication capability and a wide area communication capability. For example, the communication network 224 can include a Bluetooth wireless system, an 802.11G or 802.11N wireless system, a CAN bus, an Ethernet network within the vehicle 104, or other types of communication networks that may function with or be associated with the vehicle 104. Further, the communication network 224 can also include wide area communication capabilities, including one or more of, but not limited to, a cellular communication capability, satellite telephone communication capability, a wireless wide area network communication capability, or other types of communication capabilities that allow for the vehicle control system 204 to communicate outside the vehicle 104.

The vehicle control system 204 may communicate through the communication network 224 to a server 228 that may be located in a facility that is not within physical proximity to the vehicle 104. Thus, the server 224 may represent a cloud computing system or cloud storage that allows the vehicle control system 204 to either gain access to further computing capabilities or to storage in a location outside of the vehicle 104. The server 228 can include a computer processor and memory and be similar to any computing system as understood to one skilled in the art.

Further, the server 228 may be associated with stored data 232. The stored data 232 may be stored in any system or by any method, as described in conjunction with system data 208 and/or device data 220. The stored data 232 can include information that may be associated with one or more users 216 or associated with one or more vehicles 104. The stored data 232, being stored in a cloud or in a distant facility, may be exchanged among vehicles 104 or may be used by a user 216 in different locations or with different vehicles 104.

The vehicle control system 204 may also communicate with one or more sensors 236/242, which are either associated with the vehicle 104 or communicate with the vehicle 104. Vehicle sensors 242 may include one or more sensors for providing information to the vehicle control system 204 that determine or provide information about the environment 100 in which the vehicle 104 is operating. Embodiments of these sensors may be as described in conjunction with FIG. 4. Non-vehicle sensor 236 can be any type of sensor that isn't currently associated with the vehicle 104. For example, non-vehicle sensor 236 can be sensors in a traffic system operated by a third party that provides data to the vehicle control system 204. Further, the non-vehicle sensor 236 can be other types of sensors which provide information about the distant environment 116 or other information about the vehicle 104 or the environment 100. These non-vehicle sensors 236 may be operated by third parties but provide information to the vehicle control system 204. Examples of information that may be used by the vehicle control system 204 may include weather tracking data, user health tracking data, vehicle maintenance data, or other types of data, which may provide environmental or other data to the vehicle control system 204.

Figure 3:
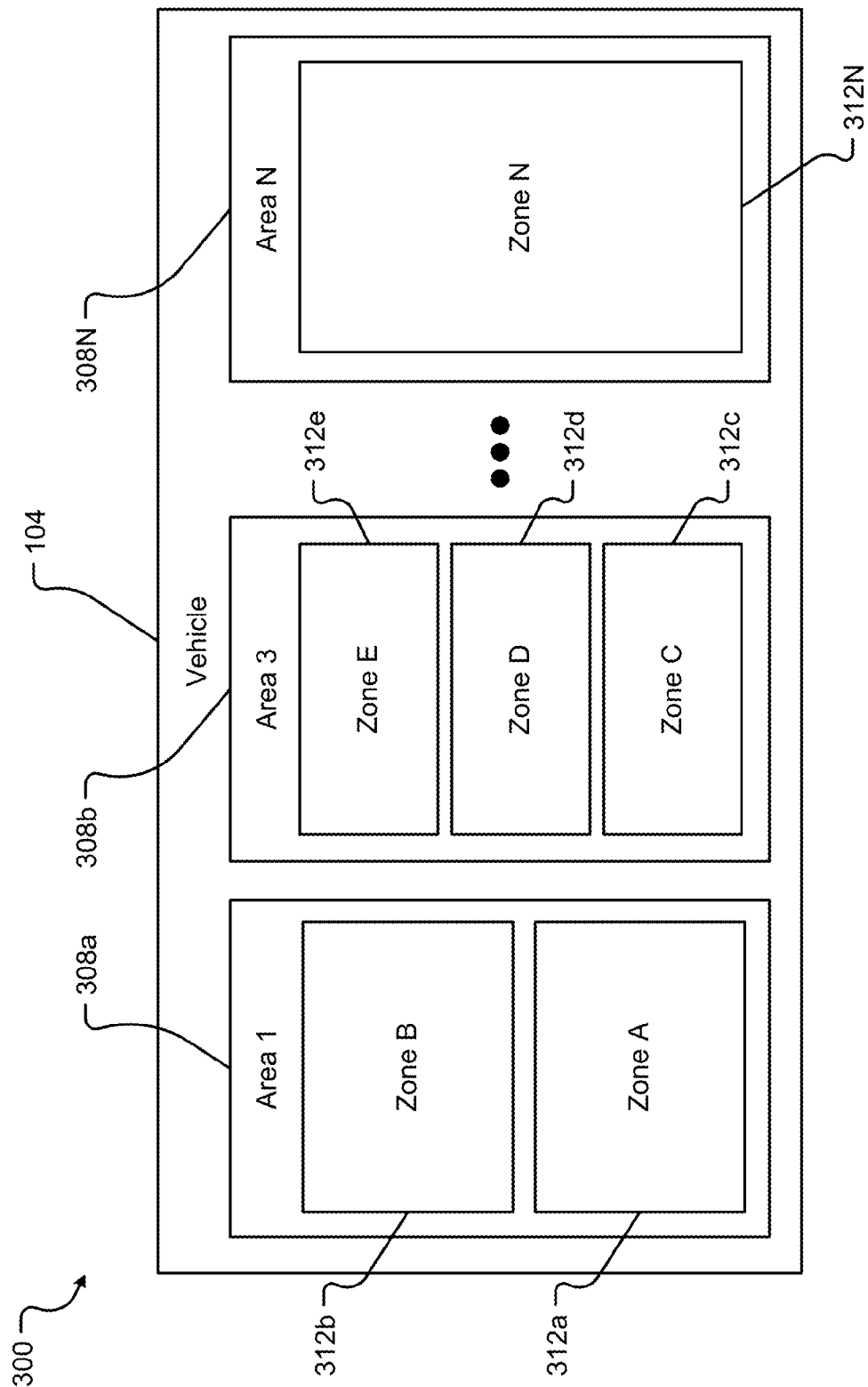
FIG. 3 is a block diagram of an embodiment of a vehicle interior environment separated into areas and/or zones.

An arrangement or configuration for sensors within a vehicle 104 is as shown in FIG. 3. The sensor arrangement 300 can include one or more areas 308 within the vehicle. An area can be a larger part of the environment inside or outside of the vehicle 104. Thus, area one 308A may include the area within the trunk space or engine space of the vehicle 104 and/or the front passenger compartment. Area three 308B may include a portion of the interior space 108 of the vehicle 104. The area N, 308N may include the trunk space or rear compartment area, when included within the vehicle 104. The interior space 108 may also be divided into areas. Thus, one area may be associated with the front passenger's and driver's seats, a second area may be associated with the middle passengers' seats, and a third area may be associated with a rear passenger's seat. Each area 308 may include one or more sensors that are positioned or operate to provide environmental information about that area 308.

Each area 308 may be further separated into one or more zones 312 within the area 308. For example, area 1 308A may be separated into zone A, 312a, and zone B, 312a. Each zone 312 may be associated with a particular portion of the interior occupied by a passenger. For example, zone A, 312a may be associated with a driver. Zone B, 312b, may be associated with a front passenger. Each zone 312 may include one or more sensors that are positioned or configured to collect information about the environment or ecosystem associated with that zone or person.

A passenger area 308b may include more than two zones as described in conjunction with area 308a. For example, area 308b may include three zones, 312c, 312d, and 312e. These three separate zones 312c, 312d, and 312e may be associated with three passenger seats typically found in the rear passenger area of an automobile 104. An area 308N and may include a single zone 312N as there may be no separate passenger areas but may include be a single trunk area within the vehicle 104. The number of zones 312 is unlimited within the areas as the areas are also unlimited inside the vehicle 104. Further, it should be noted that there may be one or areas 308 or zones 312 that may be located outside the vehicle 104 that may have a specific set of sensors associated therewith.

Figure 4:
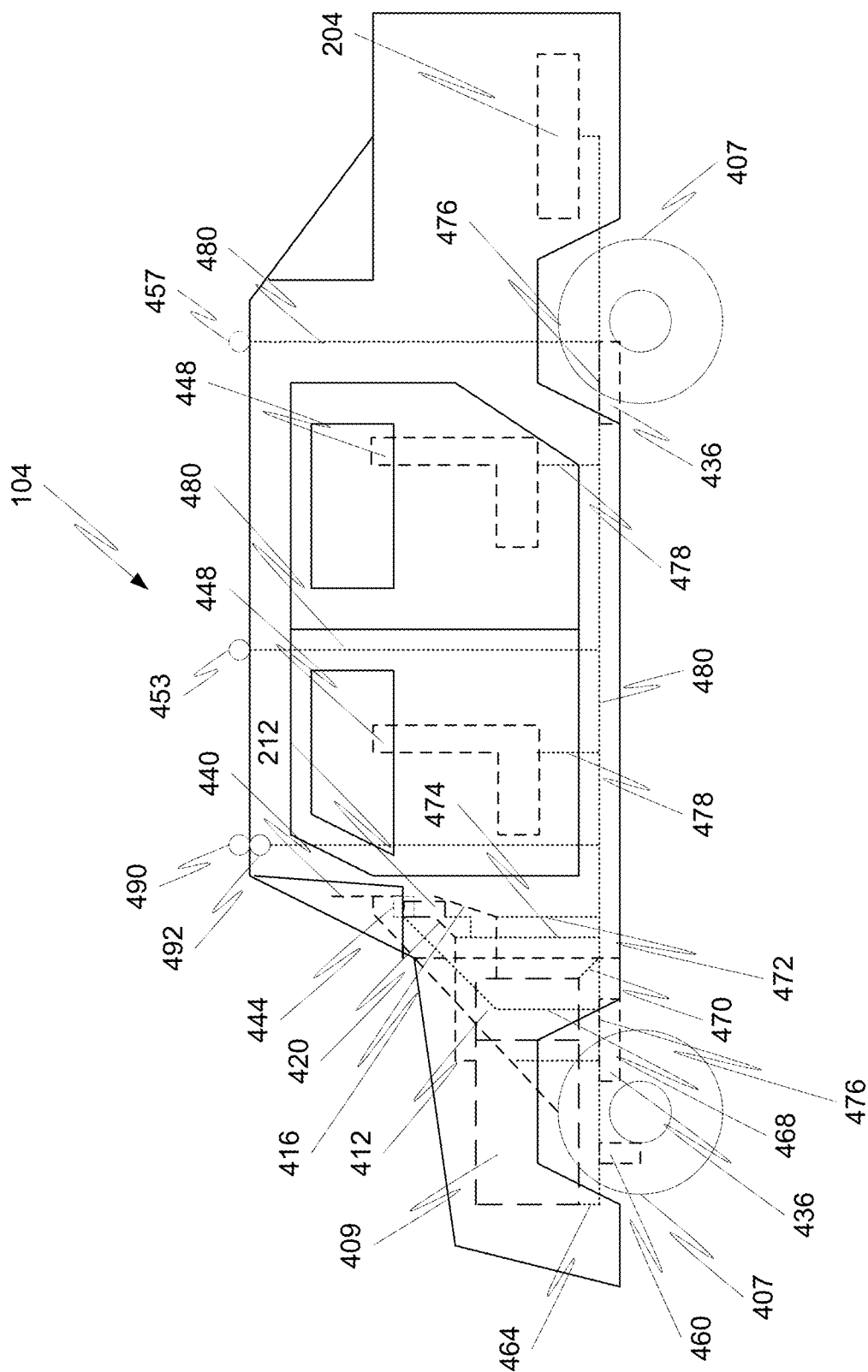
FIG. 4 depicts an embodiment of a sensor configuration for a vehicle.

A set of sensors or vehicle components 400 associated with the vehicle 404 may be as shown in FIG. 4. The vehicle 104 includes, among many other components common to vehicles, wheels 407, a power source 409 (such as an engine, motor, or energy storage system (e.g., battery or capacitive energy storage system)), a manual or automatic transmission 412, a manual or automatic transmission gear controller 416, a power controller 420 (such as a throttle), a vehicle control system 204, the display device 212, a braking system 436, a steering wheel 440, a power source activation/deactivation switch 444 (e.g., an ignition), an occupant seating system 448, a wireless signal receiver 453 to receive wireless signals from signal sources such as roadside beacons and other electronic roadside devices, and a satellite positioning system receiver 457 (e.g., a Global Positioning System ("GPS") (US), GLONASS (Russia), Galileo positioning system (EU), Compass navigation system (China), and Regional Navigational Satellite System (India) receiver).

The vehicle 104 includes a number of sensors in wireless or wired communication with the vehicle control system 204 and/or display device 212 to collect sensed information regarding the vehicle state, configuration, and/or operation. Exemplary sensors include wheel state sensor 460 to sense one or more of vehicle speed, acceleration, deceleration, wheel rotation, wheel speed (e.g., wheel revolutions-per-minute), wheel slip, and the like, a power source energy output sensor 464 to sense a power output of the power source 409 by measuring one or more of current engine speed (e.g., revolutions-per-minute), energy input and/or output (e.g., voltage, current, fuel consumption, and torque) (e.g., turbine speed sensor, input speed sensor, crankshaft position sensor, manifold absolute pressure sensor, mass flow sensor, and the like), and the like, a switch state sensor 468 to determine a current activation or deactivation state of the power source activation/deactivation switch 444, a transmission setting sensor 470 to determine a current setting of the transmission (e.g., gear selection or setting), a gear controller sensor 472 to determine a current setting of the gear controller 416, a power controller sensor 474 to determine a current setting of the power controller 420, a brake sensor 476 to determine a current state (braking or non-braking) of the braking system 436, a seating system sensor 478 to determine a seat setting and current weight of seated occupant, if any) in a selected seat of the seating system 448, exterior and interior sound receivers 490 and 492 (e.g., a microphone and other type of acoustic-to-electric transducer or sensor) to receive and convert sound waves into an equivalent analog or digital signal. Examples of other sensors (not shown) that may be employed include safety system state sensors to determine a current state of a vehicular safety system (e.g., air bag setting (deployed or undeployed) and/or seat belt setting (engaged or not engaged)), light setting sensor (e.g., current headlight, emergency light, brake light, parking light, fog light, interior or passenger compartment light, and/or tail light state (on or off)), brake control (e.g., pedal) setting sensor, accelerator pedal setting or angle sensor, clutch pedal setting sensor, emergency brake pedal setting sensor, door setting (e.g., open, closed, locked or unlocked) sensor, engine temperature sensor, passenger compartment or cabin temperature sensor, window setting (open or closed) sensor, one or more cameras or other imaging sensors (which commonly convert an optical image into an electronic signal but may include other devices for detection objects such as an electromagnetic radiation emitter/receiver that emits electromagnetic radiation and receives electromagnetic waves reflected by the object) to sense objects, such as other vehicles and pedestrians and optionally determine the distance, trajectory and speed of such objects, in the vicinity or path of the vehicle, odometer reading sensor, trip mileage reading sensor, wind speed sensor, radar transmitter/receiver output, brake wear sensor, steering/torque sensor, oxygen sensor, ambient lighting sensor, vision system sensor, ranging sensor, parking sensor, heating, venting, and air conditioning (HVAC) sensor, water sensor, air-fuel ratio meter, blind spot monitor, hall effect sensor, microphone, radio frequency (RF) sensor, infrared (IR) sensor, vehicle control system sensors, wireless network sensor (e.g., Wi-Fi and/or Bluetooth sensor), cellular data sensor, and other sensors known to those of skill in the vehicle art.

In the depicted vehicle embodiment, the various sensors are in communication with the display device 212 and vehicle control system 204 via signal carrier network 480. As noted, the signal carrier network 480 can be a network of signal conductors, a wireless network (e.g., a radio frequency, microwave, or infrared communication system using a communications protocol, such as Wi-Fi), or a combination thereof.

In one implementation, the control system 424 receives and reads sensor signals, such as wheel and engine speed signals, as a digital input comprising, for example, a pulse width modulated (PWM) signal. The processor 304 can be configured, for example, to read each of the signals into a port configured as a counter or configured to generate an interrupt on receipt of a pulse, such that the processor 304 can determine, for example, the engine speed in revolutions per minute (RPM) and the speed of the vehicle in miles per hour (MPH). One skilled in the art will recognize that the two signals can be received from existing sensors in a vehicle comprising a tachometer and a speedometer, respectively. Alternatively, the current engine speed and vehicle speed can be received in a communication packet as numeric values from a conventional dashboard subsystem comprising a tachometer and a speedometer. The transmission speed sensor signal can be similarly received as a digital input comprising a signal coupled to a counter or interrupt signal of the processor 304, or received as a value in a communication packet on the network or port interface 352 from an existing subsystem of the vehicle. The ignition sensor signal can be configured as a digital input, wherein a HIGH value represents that the ignition is on and a LOW value represents that the ignition is OFF. Three bits of the port interface 352 can be configured as a digital input to receive the gear shift position signal, representing eight possible gear shift positions. Alternatively, the gear shift position signal can be received in a communication packet as a numeric value on the port interface 352. The throttle position signal can be received as an analog input value, typically in the range 0-5 volts. Alternatively, the throttle position signal can be received in a communication packet as a numeric value on the port interface 352. The output of other sensors can be processed in a similar fashion.

Other sensors may be included and position in the interior space 108 of the vehicle 104. Generally, these interior sensors obtain data about the health of the driver and/or passenger(s), data about the safety of the driver and/or passenger(s), and/or data about the comfort of the driver and/or passenger(s). The health data sensors can include sensors in the steering wheel that can measure various health telemetry for the person (e.g., heart rate, temperature, blood pressure, blood presence, blood composition, etc.). Sensors in the seats may also provide for health telemetry (e.g., presence of liquid, weight, weight shifts, etc.). Infrared sensors could detect a person's temperature; optical sensors can determine a person's position and whether the person has become unconscious. Other health sensors are possible and included herein.

Safety sensors can measure whether the person is acting safely. Optical sensors can determine a person's position and focus. If the person stops looking at the road ahead, the optical sensor can detect the lack of focus. Sensors in the seats may detect if a person is leaning forward or may be injured by a seat belt in a collision. Other sensors can detect that the driver has at least one hand on a steering wheel. Other safety sensors are possible and contemplated as if included herein.

Comfort sensors can collect information about a person's comfort. Temperature sensors may detect a temperature of the interior cabin. Moisture sensors can determine a relative humidity. Audio sensors can detect loud sounds or other distractions. Audio sensors may also receive input from a person through voice data. Other comfort sensors are possible and contemplated as if included herein.

Figure 5:
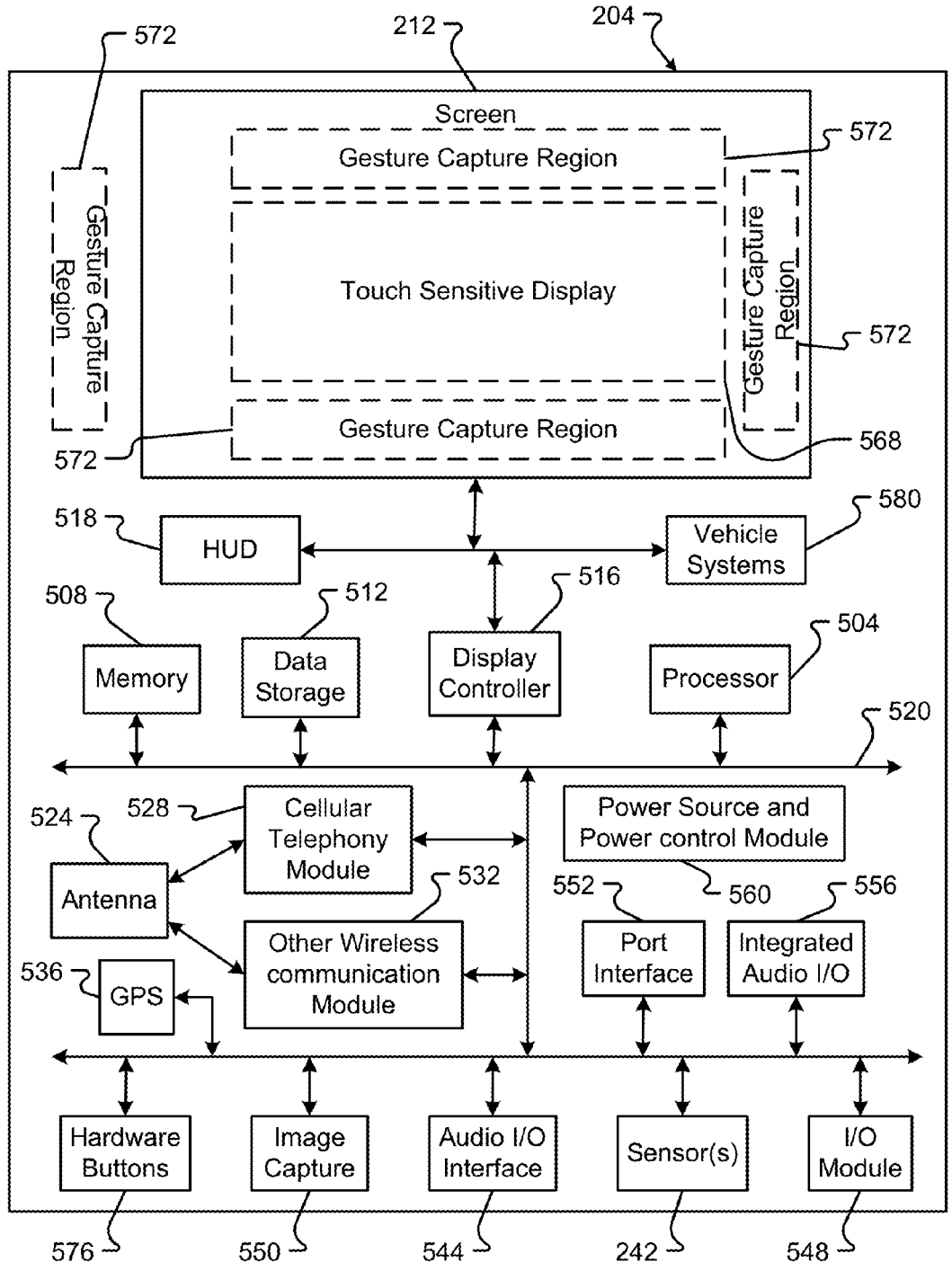
FIG. 5 is a block diagram of an embodiment of a vehicle control system.

An embodiment of a vehicle control system 204 and its associated components 204 may be as shown in FIG. 5. In general, the device 212 includes a front screen 212 with a touch sensitive display 568. The front screen 212 may be disabled and/or enabled by a suitable command. Moreover, the front screen 212 can be touch sensitive and can include different operative areas. For example, a first operative area, within the touch sensitive screen 212, may comprise a touch sensitive display 568. In general, the touch sensitive display 568 may comprise a full color, touch sensitive display. A second area within each touch sensitive screen 568 may comprise a gesture capture region 572. The gesture capture region 572 may comprise one or more areas or regions that is outside of the touch sensitive display 568 area or screen area 212, and that is capable of receiving input, for example in the form of gestures provided by a user. However, the one or more gesture capture regions 572 do not include pixels that can perform a display function or capability.

It is further anticipated that a third region of the touch sensitive screen 568 may comprise one or more configurable areas. The configurable area is capable of receiving input and has display or limited display capabilities. As can be appreciated, the configurable area may occupy any part of the touch sensitive screen 568 not allocated to a gesture capture region 572 or touch sensitive display 568. In embodiments, the configurable area may present different input options to the user. For example, the configurable area may display buttons or other relatable items. Moreover, the identity of displayed buttons, or whether any buttons are displayed at all within the configurable area of the touch sensitive screen 568 may be determined from the context in which the device 212 is used and/or operated. In an exemplary embodiment, the touch sensitive screen 568 comprises liquid crystal display devices extending across at least the region of the touch sensitive screen 568 that is capable of providing visual output to a user, and a resistive and/or capacitive input matrix over the regions of the touch sensitive screen 568 that are capable of receiving input from the user.

One or more display controllers 516 may be provided for controlling the operation of the touch sensitive screen 568, including input (touch sensing) and output (display) functions. In the exemplary embodiment illustrated in FIG. 5, a touch screen controller 516 is provided for the touch screen 568. In accordance with some embodiments, the functions of a touch screen controller 516 may be incorporated into other components, such as a processor 504.

The processor 504 may comprise a general purpose programmable processor or controller for executing application programming or instructions. In accordance with at least some embodiments, the processor 504 may include multiple processor cores, and/or implement multiple virtual processors. In accordance with still other embodiments, the processor 504 may include multiple physical processors. As a particular example, the processor 504 may comprise a specially configured application specific integrated circuit (ASIC) or other integrated circuit, a digital signal processor, a controller, a hardwired electronic or logic circuit, a programmable logic device or gate array, a special purpose computer, or the like. The processor 504 generally functions to run programming code or instructions implementing various functions of the device 212.

A device 212 may also include memory 508 for use in connection with the execution of application programming or instructions by the processor 504, and for the temporary or long term storage of program instructions and/or data. As examples, the memory 508 may comprise RAM, DRAM, SDRAM, or other solid state memory. Alternatively or in addition, data storage 512 may be provided. Like the memory 508, the data storage 512 may comprise a solid state memory device or devices. Alternatively or in addition, the data storage 512 may comprise a hard disk drive or other random access memory.

In support of communications functions or capabilities, the device 212 can include a cellular telephony module 528. As examples, the cellular telephony module 528 can comprise a GSM, CDMA, FDMA and/or analog cellular telephony transceiver capable of supporting voice, multimedia and/or data transfers over a cellular network. Alternatively or in addition, the device 212 can include an additional or other wireless communications module 532. As examples, the other wireless communications module 532 can comprise a Wi-Fi, BLUETOOTH™, WiMax, infrared, or other wireless communications link. The cellular telephony module 528 and the other wireless communications module 532 can each be associated with a shared or a dedicated antenna 524.

A port interface 552 may be included. The port interface 552 may include proprietary or universal ports to support the interconnection of the device 212 to other devices or components, such as a dock, which may include additional or different capabilities from those integral to the device 212. In addition to supporting an exchange of communication signals between the device 212 and another device or component, the docking port (not shown) and/or port interface 552 can support the supply of power to or from the device 212. The port interface 552 also comprises an intelligent element that comprises a docking module for controlling communications or other interactions between the device 212 and a connected device or component.

An input/output module 548 and associated ports may be included to support communications over wired networks or links, for example with other communication devices, server devices, and/or peripheral devices. Examples of an input/output module 548 include an Ethernet port, a Universal Serial Bus (USB) port, Institute of Electrical and Electronics Engineers (IEEE) 1594, or other interface.

An audio input/output interface/device(s) 544 can be included to provide analog audio to an interconnected speaker or other device, and to receive analog audio input from a connected microphone or other device. As an example, the audio input/output interface/device(s) 544 may comprise an associated amplifier and analog to digital converter. Alternatively or in addition, the device 212 can include an integrated audio input/output device 556 and/or an audio jack for interconnecting an external speaker or microphone. For example, an integrated speaker and an integrated microphone can be provided, to support near talk or speaker phone operations.

Hardware buttons 280 can be included for example for use in connection with certain control operations. Examples include a master power switch, volume control, etc., as described in conjunction with FIG. 2. One or more image capture interfaces/devices, such as a camera, can be included for capturing still and/or video images. Alternatively or in addition, an image capture interface/device can include a scanner or code reader. An image capture interface/device can include or be associated with additional elements, such as a flash or other light source.

The device 212 can also include a global positioning system (GPS) receiver 536. In accordance with embodiments of the present invention, the GPS receiver 536 may further comprise a GPS module that is capable of providing absolute location information to other components of the device 212. Other sensors 242 may also be included. For example, an accelerometer(s)/gyroscope(s) may also be included. For example, in connection with the display of information to a user and/or other functions, a signal from the accelerometer/gyroscope can be used to determine an orientation and/or format in which to display that information to the user. In some embodiments, the accelerometer/gyroscope may comprise at least one accelerometer and at least one gyroscope.

Embodiments of the present invention can also include one or more magnetic sensing feature. The magnetic sensing feature can be configured to provide a signal indicating the position of the device relative to a vehicle-mounted position. This information can be provided as an input, for example to a user interface application, to determine an operating mode, characteristics of the touch sensitive display 568 and/or other device 212 operations. As examples, a magnetic sensing feature can comprise one or more of Hall-effect sensors, a multiple position switch, an optical switch, a Wheatstone bridge, a potentiometer, or other arrangement capable of providing a signal indicating of multiple relative positions the touch screens are in. Alternatively, the magnetic sensing feature may comprise one or more metallic elements used by other sensors associated with the console and/or vehicle to determine whether the device 212 is in a vehicle-mounted position. These metallic elements may include but are not limited to rare-earth magnets, electromagnets, ferrite and/or ferrite alloys, and/or other material capable of being detected by a range of sensors.

Communications between various components of the device 212 can be carried by one or more buses 520. In addition, power can be supplied to the components of the device 212 from a power source and/or power control module 560. The power control module 560 can, for example, include a battery, an AC to DC converter, power control logic, and/or ports for interconnecting the device 212 to an external source of power.

Figure 6:
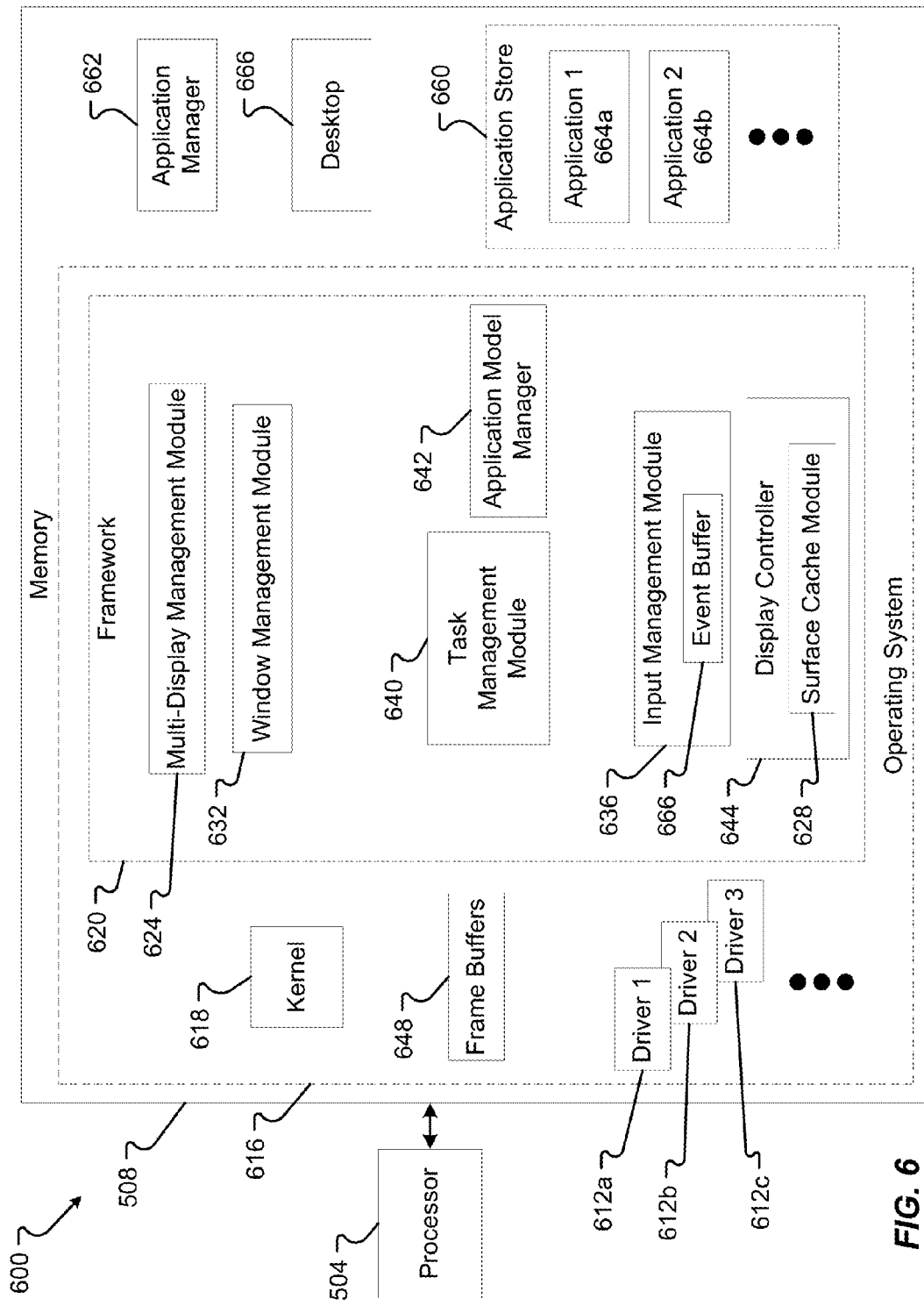
FIG. 6 another block diagram of an embodiment of a vehicle control system.

An embodiment of one or more software modules that may be associated with the vehicle control system 204 may be as shown in FIG. 6. The memory 508 may store and the processor 504 may execute one or more software components. These components can include at least one operating system (OS) 616, an application manager 662, a console desktop 666, and/or one or more applications 664a and/or 664b from an application store 660. The OS 616 can include a framework 620, one or more frame buffers 648, one or more drivers 612, and/or a kernel 618. The OS 616 can be any software, consisting of programs and data, which manages computer hardware resources and provides common services for the execution of various applications 664. The OS 616 can be any operating system and, at least in some embodiments, dedicated to mobile devices, including, but not limited to, Linux, ANDROID™, iPhone OS (IOS™), WINDOWS PHONE 7™, etc. The OS 616 is operable to provide functionality to the device 212 by executing one or more operations, as described herein.

The applications 664 can be any higher level software that executes particular console functionality for the user. Applications 664 can include programs such as vehicle control applications, email clients, web browsers, texting applications, games, media players, office suites, etc. The applications 664 can be stored in an application store 660, which may represent any memory or data storage, and the management software associated therewith, for storing the applications 664. Once executed, the applications 664 may be run in a different area of memory 608.

The framework 620 may be any software or data that allows the multiple tasks running on the device to interact. In embodiments, at least portions of the framework 620 and the discrete components described hereinafter may be considered part of the OS 616 or an application 664. However, these portions will be described as part of the framework 620, but those components are not so limited. The framework 620 can include, but is not limited to, a Surface Cache module 628, a Window Management module 632, an Input Management module 636, an Application Model Manager 642, a Display Controller 644, one or more frame buffers 648, and/or an event buffer 666.

The Surface Cache module 628 includes any memory or storage and the software associated therewith to store or cache one or more images of applications, windows, and/or console screens. A series of active and/or non-active windows (or other display objects, such as, a desktop display) can be associated with each display. An active window (or other display object) is currently displayed. A non-active window (or other display objects) was opened and, at some time, displayed but are now not displayed. To enhance the user experience, before a window transitions from an active state to an inactive state, a "screen shot" of a last generated image of the window (or other display object) can be stored. The Surface Cache module 628 may be operable to store a bitmap of the last active image of a window (or other display object) not currently displayed. Thus, the Surface Cache module 628 stores the images of non-active windows (or other display objects) in a data store.

In embodiments, the Window Management module 632 is operable to manage the windows (or other display objects) that are active or not active on each of the displays. The Window Management module 632, based on information from the OS 616, or other components, determines when a window (or other display object) is visible or not active. The Window Management module 632 may then put a non-visible window (or other display object) in a "not active state" and, in conjunction with the Task Management module 640 suspends the application's operation. Further, the Window Management module 632 may assign a display identifier to the window (or other display object) or manage one or more other items of data associated with the window (or other display object). The Window Management module 632 may also provide the stored information to the application 664, or other components interacting with or associated with the window (or other display object). The Window Management module 632 can also associate an input task with a window based on window focus and display coordinates within the motion space.

The Input Management module 636 is operable to manage events that occur with the device. An event is any input into the window environment, for example, a user interface interactions with a user. The Input Management module 636 receives the events and logically stores the events in an event buffer 656. Events can include such user interface interactions as a "down event," which occurs when the screen 204 receives a touch signal from a user, a "move event," which occurs when the screen 204 determines that a user's finger is moving across a screen(s), an "up event", which occurs when the device 212 determines that the user has stopped touching the screen 568 etc. These events are received, stored, and forwarded to other modules by the Input Management module 636. The Input Management module 636 may also map screen inputs to a motion space which is the culmination of all physical and virtual display available on the device.

The frame buffer 648 is a logical structure(s) used to render the user interface. The frame buffer 648 can be created and destroyed by the OS kernel 618. However, the Display Controller 644 can write the image data, for the visible windows, into the frame buffer 648. A frame buffer 648 can be associated with one screen or multiple screens. The association of a frame buffer 648 with a screen can be controlled dynamically by interaction with the OS kernel 618. A composite display may be created by associating multiple screens with a single frame buffer 648. Graphical data used to render an application's window user interface may then be written to the single frame buffer 648, for the composite display, which is output to the multiple screens 204. The Display Controller 644 can direct an application's user interface to a portion of the frame buffer 648 that is mapped to a particular display 208, thus, displaying the user interface on only one screen 212. The Display Controller 644 can extend the control over user interfaces to multiple applications, controlling the user interfaces for as many displays as are associated with a frame buffer 648 or a portion thereof. This approach compensates for the physical screen 212 and any other console screens that are in use by the software component above the Display Controller 644.

The Application Manager 662 is an application that provides a presentation layer for the window environment. Thus, the Application Manager 662 provides the graphical model for rendering. Likewise, the Desktop 666 provides the presentation layer for the Application Store 660. Thus, the desktop provides a graphical model of a surface having selectable application icons for the Applications 664 in the Application Store 660 that can be provided to the Window Management Module 632 for rendering.

Further, the framework can include an Application Model Manager (AMM) 642. The Application Manager 662 may interface with the AMM 642. In embodiments, the AMM 642 receives state change information from the device 212 regarding the state of applications (which are running or suspended). The AMM 642 can associate bit map images from the Surface Cache Module 628 to the applications that are alive (running or suspended). Further, the AMM 642 may provide a list of executing applications to the Application Manager 662.

One or more gestures used to interface with the vehicle control system 204 may be as described in conjunction with FIGS. 7A through 7K. FIGS. 7A through 7H depict various graphical representations of gesture inputs that may be recognized by the screen(s) 212. The gestures may be performed not only by a user's body part, such as a digit, but also by other devices, such as a stylus, that may be sensed by the contact sensing portion(s) of a screen 212. In general, gestures are interpreted differently, based on where the gestures are performed (either directly on the display 568 or in the gesture capture region 572). For example, gestures in the display 568 may be directed to a desktop or application, and gestures in the gesture capture region 572 may be interpreted as for the system.

With reference to FIGS. 7A-7H, a first type of gesture, a touch gesture 720, is substantially stationary on the screen 212 for a selected length of time. A circle 728 represents a touch or other contact type received at particular location of a contact sensing portion of the screen. The circle 728 may include a border 732, the thickness of which indicates a length of time that the contact is held substantially stationary at the contact location. For instance, a tap 720 (or short press) has a thinner border 732a than the border 732b for a long press 724 (or for a normal press). The long press 724 may involve a contact that remains substantially stationary on the screen for longer time period than that of a tap 720. As will be appreciated, differently defined gestures may be registered depending upon the length of time that the touch remains stationary prior to contact cessation or movement on the screen.

Figure 7A:
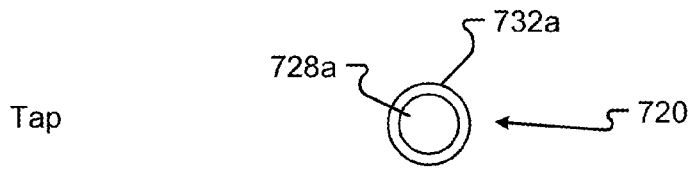
FIG. 7A is a graphical representation of an embodiment of a gesture that a user may perform to provide input to a vehicle control system.
Figure 7B:
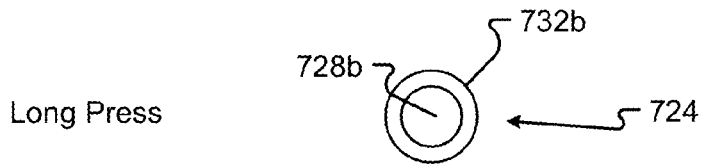
FIG. 7B is a graphical representation of an embodiment of a gesture that a user may perform to provide input to a vehicle control system.
Figure 7C:
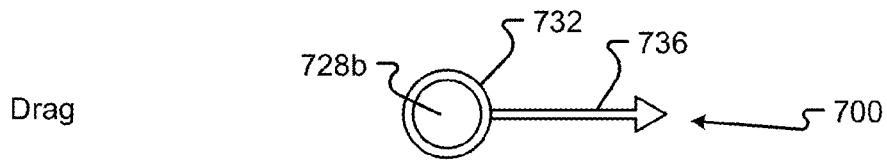
FIG. 7C is a graphical representation of an embodiment of a gesture that a user may perform to provide input to a vehicle control system.

With reference to FIG. 7C, a drag gesture 700 on the screen 212 is an initial contact (represented by circle 728) with contact movement 736 in a selected direction. The initial contact 728 may remain stationary on the screen 212 for a certain amount of time represented by the border 732. The drag gesture typically requires the user to contact an icon, window, or other displayed image at a first location followed by movement of the contact in a drag direction to a new second location desired for the selected displayed image. The contact movement need not be in a straight line but have any path of movement so long as the contact is substantially continuous from the first to the second locations.

Figure 7D:
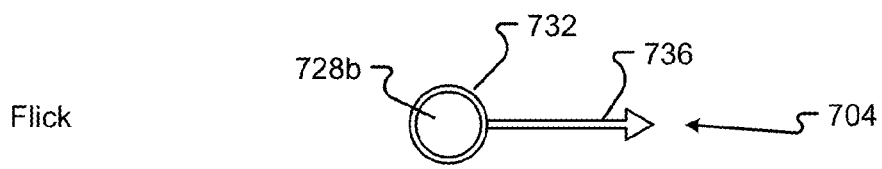
FIG. 7D is a graphical representation of an embodiment of a gesture that a user may perform to provide input to a vehicle control system.

With reference to FIG. 7D, a flick gesture 704 on the screen 212 is an initial contact (represented by circle 728) with truncated contact movement 736 (relative to a drag gesture) in a selected direction. In embodiments, a flick has a higher exit velocity for the last movement in the gesture compared to the drag gesture. The flick gesture can, for instance, be a finger snap following initial contact. Compared to a drag gesture, a flick gesture generally does not require continual contact with the screen 212 from the first location of a displayed image to a predetermined second location. The contacted displayed image is moved by the flick gesture in the direction of the flick gesture to the predetermined second location. Although both gestures commonly can move a displayed image from a first location to a second location, the temporal duration and distance of travel of the contact on the screen is generally less for a flick than for a drag gesture.

Figure 7E:
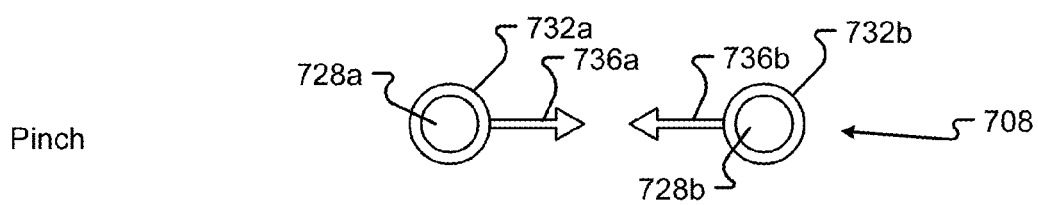
FIG. 7E is a graphical representation of an embodiment of a gesture that a user may perform to provide input to a vehicle control system.

With reference to FIG. 7E, a pinch gesture 708 on the screen 212 is depicted. The pinch gesture 708 may be initiated by a first contact 728 to the screen 212 by, for example, a first digit and a second contact 728b to the screen 212 by, for example, a second digit. The first and second contacts 728a,b may be detected by a common contact sensing portion of a common screen 212, by different contact sensing portions of a common screen 212, or by different contact sensing portions of different screens 212. The first contact 728a is held for a first amount of time, as represented by the border 732a, and the second contact 728b is held for a second amount of time, as represented by the border 732b. The first and second amounts of time are generally substantially the same, and the first and second contacts 728a,b generally occur substantially simultaneously. The first and second contacts 728a,b generally also include corresponding first and second contact movements 736a,b, respectively. The first and second contact movements 736a,b are generally in opposing directions. Stated another way, the first contact movement 736a is towards the second contact 736b, and the second contact movement 736b is towards the first contact 736a. More simply stated, the pinch gesture 708 may be accomplished by a user's digits touching the screen 212 in a pinching motion.

Figure 7F:
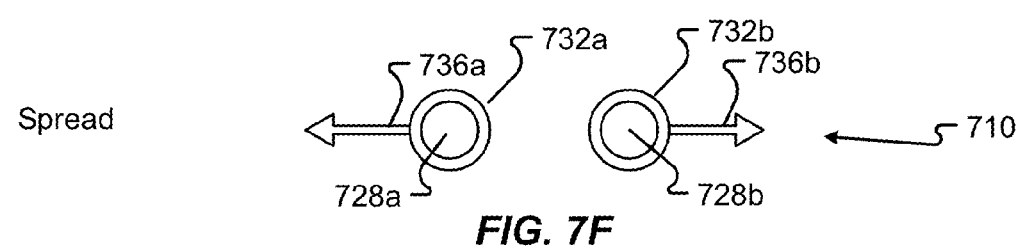
FIG. 7F is a graphical representation of an embodiment of a gesture that a user may perform to provide input to a vehicle control system.

With reference to FIG. 7F, a spread gesture 710 on the screen 212 is depicted. The spread gesture 710 may be initiated by a first contact 728a to the screen 212 by, for example, a first digit and a second contact 728b to the screen 212 by, for example, a second digit. The first and second contacts 728a,b may be detected by a common contact sensing portion of a common screen 212, by different contact sensing portions of a common screen 212, or by different contact sensing portions of different screens 212. The first contact 728a is held for a first amount of time, as represented by the border 732a, and the second contact 728b is held for a second amount of time, as represented by the border 732b. The first and second amounts of time are generally substantially the same, and the first and second contacts 728a,b generally occur substantially simultaneously. The first and second contacts 728a,b generally also include corresponding first and second contact movements 736a,b, respectively. The first and second contact movements 736a,b are generally in a common direction. Stated another way, the first and second contact movements 736a,b are away from the first and second contacts 728a,b. More simply stated, the spread gesture 710 may be accomplished by a user's digits touching the screen 212 in a spreading motion.

Figure 7G:
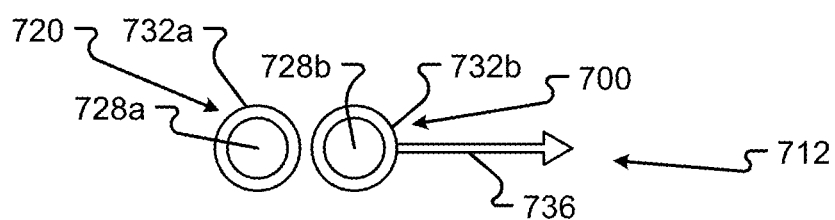
FIG. 7G is a graphical representation of an embodiment of a gesture that a user may perform to provide input to a vehicle control system.
Figure 7H:
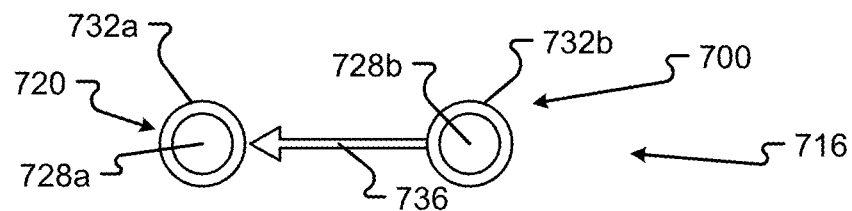
FIG. 7H is a graphical representation of an embodiment of a gesture that a user may perform to provide input to a vehicle control system.

The above gestures may be combined in any manner, such as those shown by FIGS. 7G and 7H, to produce a determined functional result. For example, in FIG. 7G a tap gesture 720 is combined with a drag or flick gesture 712 in a direction away from the tap gesture 720. In FIG. 7H, a tap gesture 720 is combined with a drag or flick gesture 712 in a direction towards the tap gesture 720.

The functional result of receiving a gesture can vary depending on a number of factors, including a state of the vehicle 104, display 568, or screen 212, a context associated with the gesture, or sensed location of the gesture. The state of the vehicle commonly refers to one or more of a configuration of the vehicle 104, a display orientation, and user and other inputs received by the vehicle 104. Context commonly refers to one or more of the particular application(s) selected by the gesture and the portion(s) of the application currently executing, whether the application is a single- or multi-screen application, and whether the application is a multi-screen application displaying one or more windows. Sensed location of the gesture commonly refers to whether the sensed set(s) of gesture location coordinates are on a touch sensitive display 568 or a gesture capture region 572, whether the sensed set(s) of gesture location coordinates are associated with a common or different display or screen 212, and/or what portion of the gesture capture region contains the sensed set(s) of gesture location coordinates.

A tap, when received by an a touch sensitive display 568, can be used, for instance, to select an icon to initiate or terminate execution of a corresponding application, to maximize or minimize a window, to reorder windows in a stack, and to provide user input such as by keyboard display or other displayed image. A drag, when received by a touch sensitive display 568, can be used, for instance, to relocate an icon or window to a desired location within a display, to reorder a stack on a display, or to span both displays (such that the selected window occupies a portion of each display simultaneously). A flick, when received by a touch sensitive display 568 or a gesture capture region 572, can be used to relocate a window from a first display to a second display or to span both displays (such that the selected window occupies a portion of each display simultaneously). Unlike the drag gesture, however, the flick gesture is generally not used to move the displayed image to a specific user-selected location but to a default location that is not configurable by the user.

The pinch gesture, when received by a touch sensitive display 568 or a gesture capture region 572, can be used to minimize or otherwise increase the displayed area or size of a window (typically when received entirely by a common display), to switch windows displayed at the top of the stack on each display to the top of the stack of the other display (typically when received by different displays or screens), or to display an application manager (a "pop-up window" that displays the windows in the stack). The spread gesture, when received by a touch sensitive display 568 or a gesture capture region 572, can be used to maximize or otherwise decrease the displayed area or size of a window, to switch windows displayed at the top of the stack on each display to the top of the stack of the other display (typically when received by different displays or screens), or to display an application manager (typically when received by an off-screen gesture capture region on the same or different screens).

The combined gestures of FIG. 7G, when received by a common display capture region in a common display or screen 212, can be used to hold a first window location constant for a display receiving the gesture while reordering a second window location to include a window in the display receiving the gesture. The combined gestures of FIG. 7H, when received by different display capture regions in a common display or screen 212 or in different displays or screens, can be used to hold a first window location for a display receiving the tap part of the gesture while reordering a second window location to include a window in the display receiving the flick or drag gesture. Although specific gestures and gesture capture regions in the preceding examples have been associated with corresponding sets of functional results, it is to be appreciated that these associations can be redefined in any manner to produce differing associations between gestures and/or gesture capture regions and/or functional results.

Figure 7I:
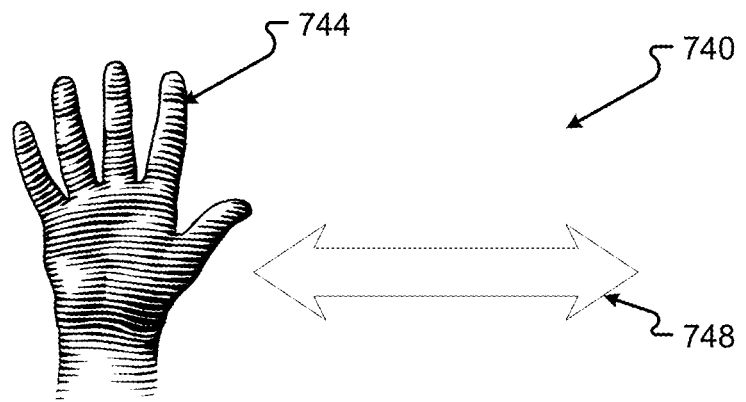
FIG. 7I is a graphical representation of an embodiment of a gesture that a user may perform to provide input to a vehicle control system.
Figure 7J:
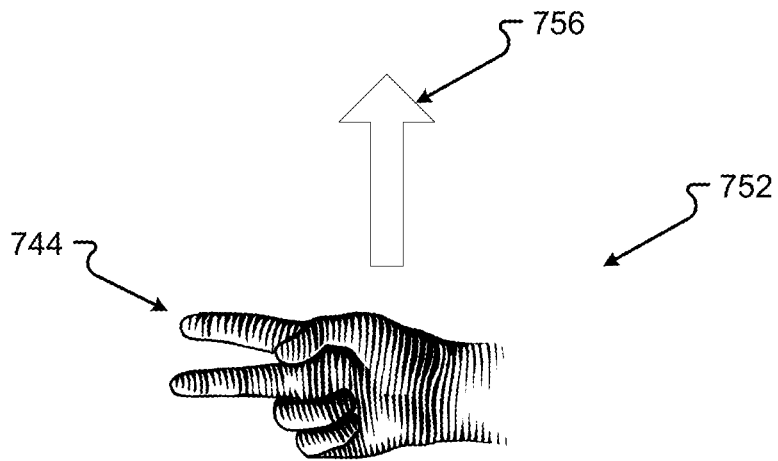
FIG. 7J is a graphical representation of an embodiment of a gesture that a user may perform to provide input to a vehicle control system.
Figure 7K:
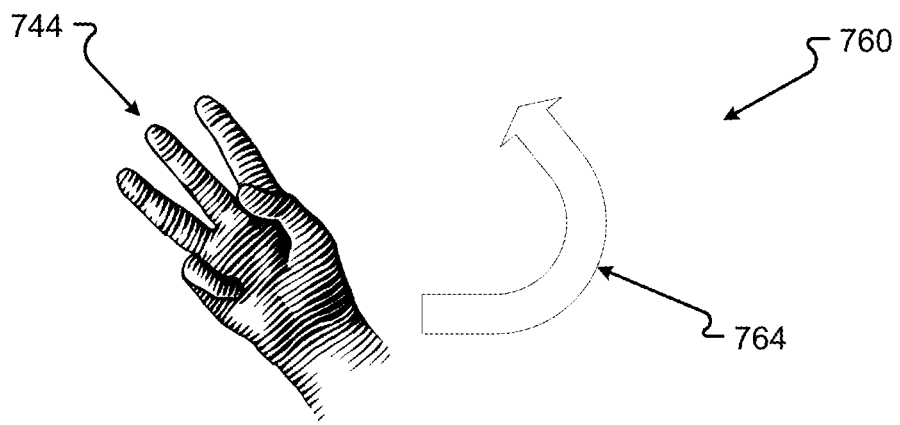
FIG. 7K is a graphical representation of an embodiment of a gesture that a user may perform to provide input to a vehicle control system.

Gestures that may be completed in three-dimensional space and not on a touch sensitive screen 568 or gesture capture region 572 may be as shown in FIGS. 7I through 7K.

The gestures may be completed in an area where a sensor 242, such as an optical sensor, infrared sensor, or other type of sensor, may detect the gesture. For example, the gesture 740 in FIG. 7I, a person may open their hand 764 and move their hand in a back and forth direction 748 as a gesture 740 to complete some function with the vehicle 104. For example gesture 764 may change the station of the radio in the vehicle 104. The sensors 242 may both determine the configuration of the hand and the vector of the movement. The vector and hand configuration can be interpreted to mean certain things to the vehicle control system 204 and produce different results.

In another example of a gesture 752 in FIG. 7J, a user may configure their hand 764 to extend two fingers and move the hand in an up and down operation 756. This gesture 752 may control the volume of the radio or some other function. Again, the sensors 242 may determine how the person has configured their hand gesture, and the vector of the movement. In another example of a gesture 760 shown in FIG. 7K, a user may extend their middle three fingers at an angle 45° from straight vertical and circle the hand in a counter-clockwise motion 764. This gesture 760 may cause the automobile to change the heat or do some other function. As can be understood by one skilled in the art, the configurations of the hand and the types of movement are variable. Thus, the user may configure the hand 764 in any way imaginable and may also move that hand 764 in any direction with any vector in three-dimensional space.

The gestures 740, 752, 760, as shown in FIG. 7I through 7K, may occur in a predetermined volume of space within the vehicle 104. For example, a sensor 242 may be configured to identify such gestures 740, 752, 760 between the front passenger's and front driver's seats over a console area within the passenger compartment of the automobile 104. The gestures 740, 752, 760 may be made within area 1 304a between zones A 312a and B 312b. However, there may be other areas 308 where a user may use certain gestures, where sensors 242 may be able to determine a certain function is desired. Gestures that may be similar but used in different areas within the vehicle 104 may cause different functions to be performed. For example, the gesture 740 in FIG. 7I, if used in zone E 312e, may change the heat provided in zone E 312e, but may change the station of a radio if used in zone A 312a. Further, the gestures may be made with other body parts or, for example, different expressions of a persons' face may be used to control functions in the vehicle 104. Also, the user may use two hands in some circumstances or do other types of physical movements that can cause different reactions in the vehicle 104.

Figure 8:
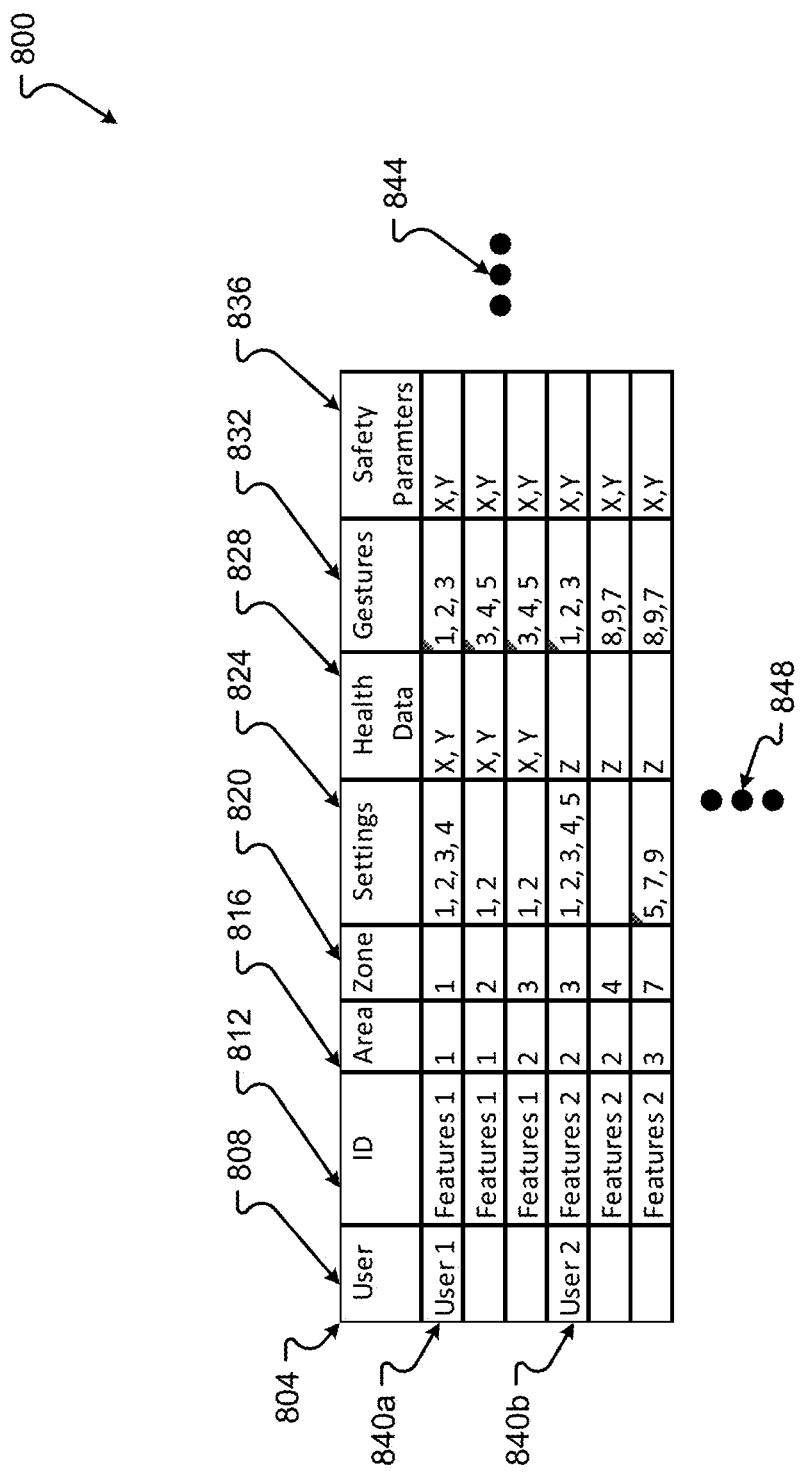
FIG. 8 is a diagram of an embodiment of a data structure for storing information about a user of a vehicle.

An embodiment of a data structure 800 to store different settings is shown in FIG. 8. The data structure 800 may include one or more of data files or data objects 804. Thus, the data structure 800 may represent different types of data bases or data storage, for example, object-oriented data bases, flat file data structures, relational database, or other types of data storage arrangements. The data file 804 may include several portions 808-836 representing different types of data. Each of these types of data may be associated with a user, as shown in portion 808.

There may be one or more user records 840 and associated data stored within the data file 804. The user can be any person that uses or rides within the vehicle or conveyance 104. The user may be identified in portion 812. For the vehicle 104, the user may include a set of one or more features that may identify the user. These features may be the physical characteristics of the person that may be identified by facial recognition or some other type of system. In other embodiments, the user may provide a unique code to the vehicle control system 204 or provide some other type of data that allows the vehicle control system 204 to identify the user. The features or characteristics of the user are then stored in portion 812.

Each user identified in portion 808 may have a different set of settings for each area 308 and/or each zone 312 within the vehicle 104. Thus, each set of setting may also be associated with a predetermined zone 312 or area 308. The zone 312 is stored in portion 820 and the area 308 is stored in portion 816.

One or more settings may be stored in portion 824. These settings 824 may be the configurations of different functions within the vehicle 104 that are specified by or for that user. For example, the settings 824 may be the position of a seat, the position of a steering wheel, a heating/cooling setting, a radio setting, a cruise control setting, or some other type of setting associated with the vehicle 104. Further, in vehicles adapted to have a configurable console or a configurable dash or heads-up display, the settings 824 may also provide for how that heads-up display, dash, or console are configured for this particular user. Each setting 824 may be associated with a different area 308 or zone 312. Thus, there may be more settings 824 for when the user is the driver and in zone A, 312A, of area 1, 308A. However, there may be similar settings 824 among the different zones 312 or areas 308 as shown in portion 824. For example, the heating or radio settings for the user may be similar in every zone 312.

The sensors 242 within the vehicle 104 may be able to either obtain or track health data in portion 828. Health data 828 may include any type of physical characteristic associated with the user. For example, a heart rate, a blood pressure, a temperature, or other types of heath data may be obtained and stored in portion 828. The user may have this health data tracked over a period of time to allow for statistical analysis of the user's health while operating the vehicle 104. In this way if some function of the user's health deviates from a norm, the vehicle 104 may be able to determine there is a problem with the person and react to that data.

One or more gestures may be stored in portion 832. Thus, the gestures used and described in conjunction FIG. 7A through 7K may be configurable. These gestures may be determined or created by the user and stored in portion 832. A user may have different gestures for each zone 312 or area 308 within the vehicle. The gestures that do certain things while driving may do other things while in a different area 308 of the vehicle 104. Thus, the user may use a first set of gestures while driving and a second set while a passenger. Further, one or more users may share gestures as shown in portion 832. Each driver may have a common set of gestures that they use in zone A, 312a. Each of these gestures may be determined or captured and then stored with their average characteristics (e.g., vector, position of gesture, etc.) in portion 832.

One or more sets of safety parameters may be stored in portion 836. Safety parameters 836 may be common operating characteristics for this driver/passenger or for all drivers/passengers that if deviated from may determine there is a problem with the driver/passenger or the vehicle 104. For example, a certain route may be taken repeatedly and an average speed or mean speed may be determined. If the mean speed deviates by some number of standard deviations, a problem with the vehicle 104 or the user may be determined. In another example, the health characteristics or driving experience of the user may be determined. If the user drives in a certain position where their head occupies a certain portion of three-dimensional space within the vehicle 104, the vehicle control system 204 may determine that the safety parameter includes the users face or head being within this certain portion of the vehicle interior space. If the user's head deviates from that interior space for some amount of time, the vehicle control system 204 can determine that something is wrong with the driver and change the function or operation of the vehicle 104 to assist the driver. This may happen, for example, when a user falls asleep at the wheel. If the user's head droops and does no longer occupy a certain three dimensional space, the vehicle control system 204 can determine that the driver has fallen asleep and may take control of the operation of the vehicle 204 and steer the vehicle 204 to the side of the road. In other examples, if the user's reaction time is too slow or some other safety parameter is not nominal, the vehicle control system 204 may determine that the user is inebriated or having some other medical problem. The vehicle control system 204 may then assume control of the vehicle to ensure that the driver is safe.

Figure 9:
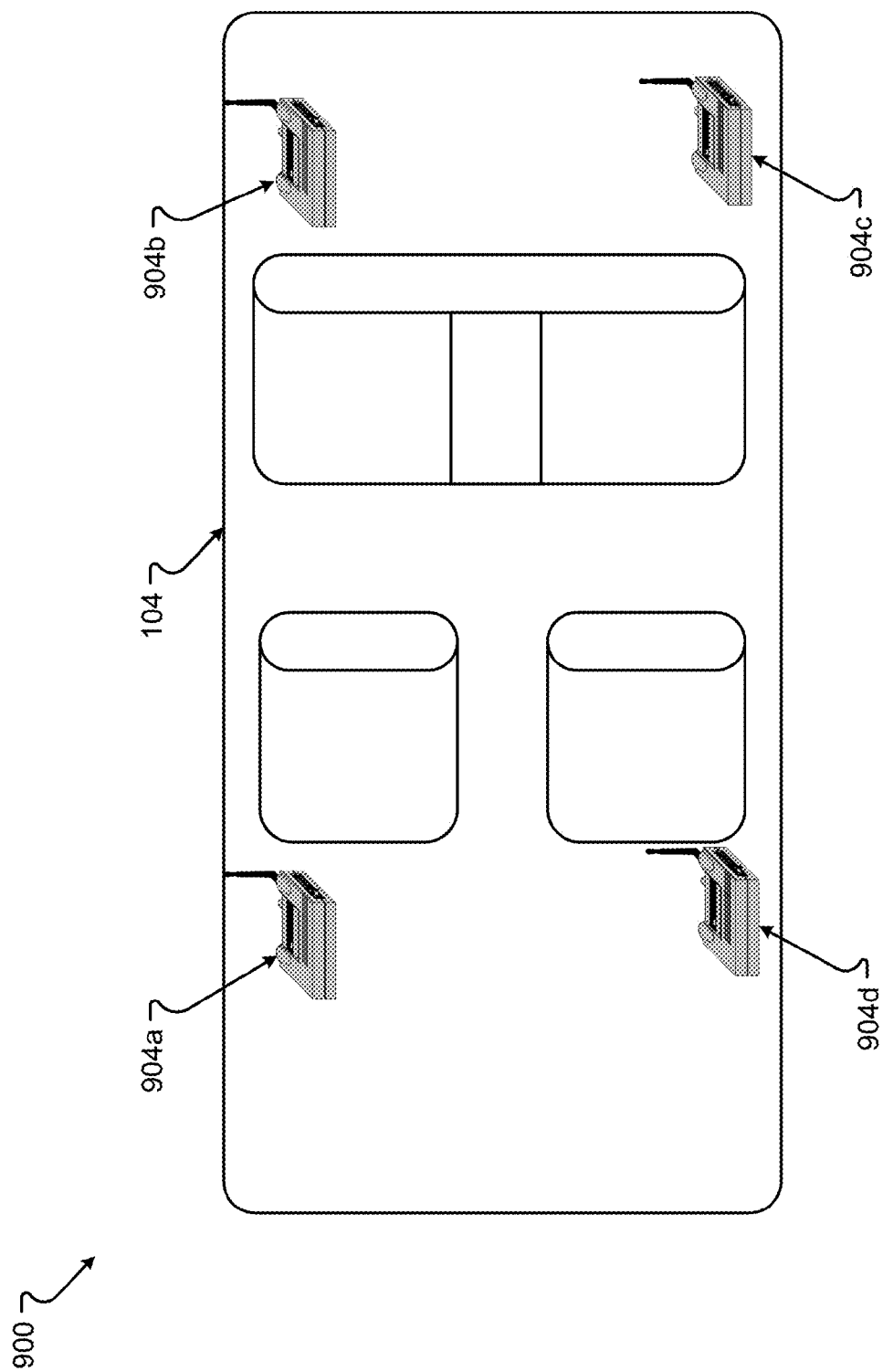
FIG. 9 is a representation of a vehicle interior that shows an embodiment of an antenna placement configuration.

An embodiment for communication system configuration 900 is shown in FIG. 9. Here the vehicle 104 is shown with an interior cabin. The interior cabin may include two or more different communication transceivers 904. The communication transceivers 904 may be positioned within the vehicle cabin as to provide for signal identification and location. For example, the communication transceivers 904A, 904B, 904C, and 904D are currently located at the corner or extents of the vehicle 104. In this way, signals received by the communication transceivers 904 may be studied or analyzed such that the location of the signal may be determined to be within the vehicle 104. As such, the communication transceivers 904 create a geo-fence around the vehicle 104 that allows the communication system to determine whether received signals are currently originating inside the vehicle 104.

Figure 10:
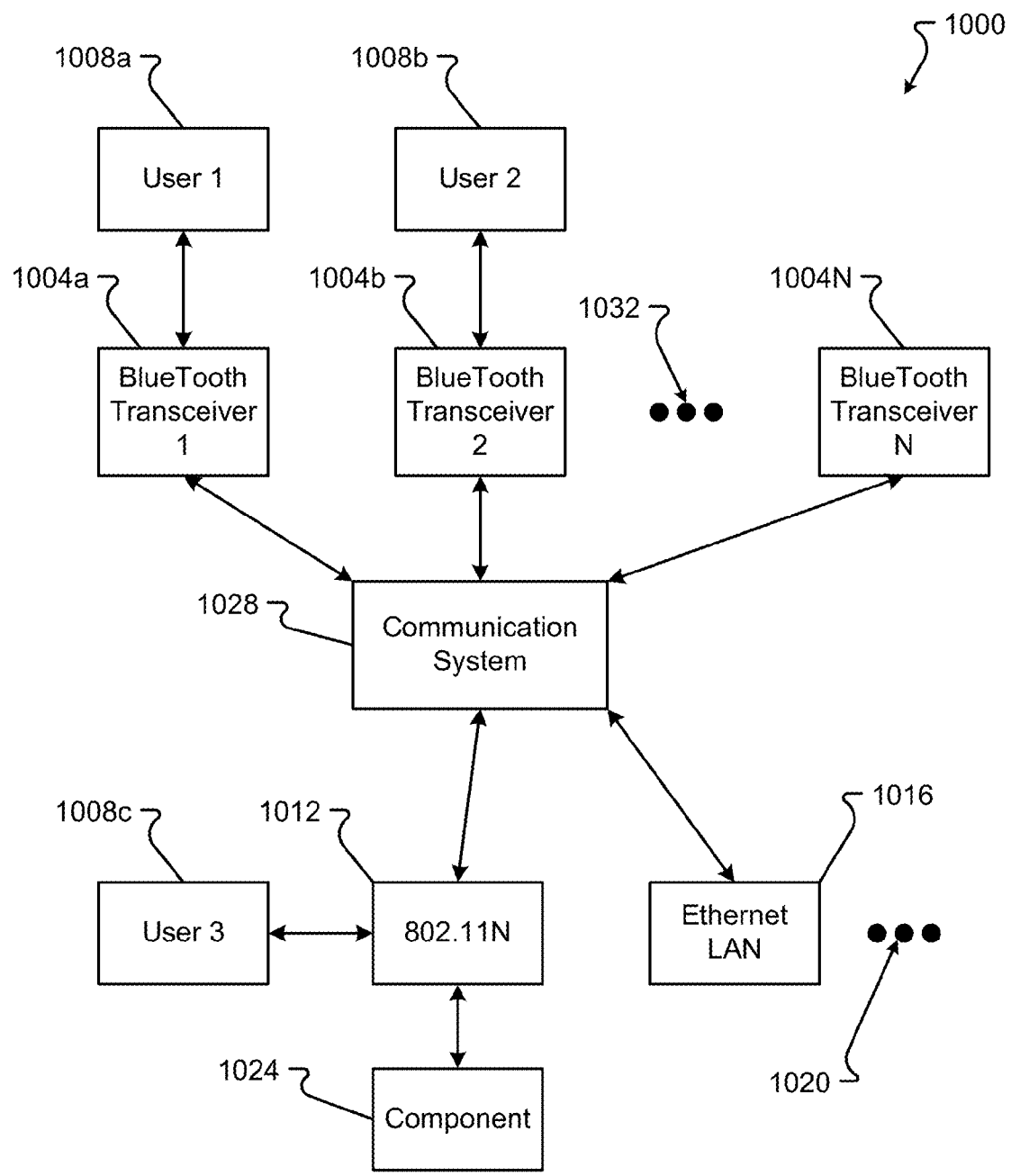
FIG. 10 is a block diagram of an embodiment of a communication system.

An embodiment of a communication system or network 1000 is shown in FIG. 10. The communication system 1000 can include two or more bluetooth transceivers 104. Each bluetooth transceiver may be paired to communicate with the single-user device 1008. Thus, bluetooth transceiver one 1004A may communicate with user one device 1008A. There may be any number of different bluetooth transceivers as represented by Ellipses 1032. Bluetooth transceivers may conduct communications with the bluetooth protocol with the user device 10,008. Information received and/or sent to the user device 10,008 may originate from the communication system 1028. An embodiment of a communication system is as provided in FIG. 11.

The communication system 1000 may also include other communication components that can communicate with different protocols. For example, communication router 1012 may communicate using an 802.11 and 802.11G or other wireless land protocol. The wireless land router 1012 may communicate with another user 1008C or other components 1024. Thus, those users or components not able to communicate through the array of bluetooth transceivers may still communicate to the vehicle communication system 1028. Other types of communication devices or components may include an Ethernet LAN 1016. The Ethernet LAN 1016 may include one or more hard-wired ports that may be connected within the vehicle. There may be other types of protocols or systems used to communicate with the communication system 1028 as represented by Ellipses 1020. The components within the communication system 1000 may be hardware and/or software and may operate as understood in the art as associated with these communication protocols.

Figure 11:
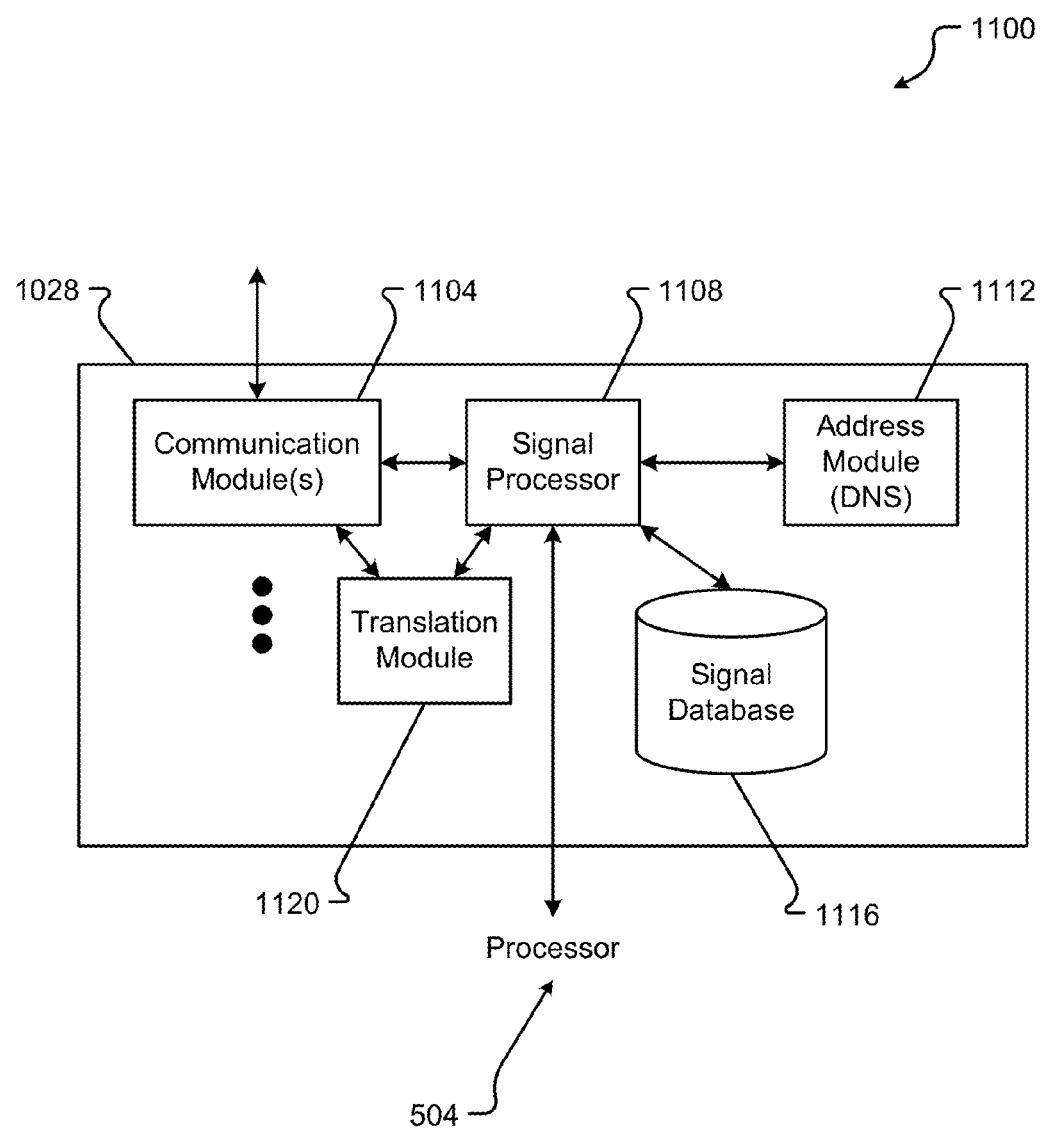
FIG. 11 is a block diagram of another embodiment of a communication system.

An embodiment of a communication system 1028 is shown in FIG. 11. The communication system 1028 may include two or more communication modules 1104. Each communication module may communicate with a particular type of communication component, for example, the bluetooth transceivers 1004, the 802.11 router, 1012, or other types of communication systems. The system communication module may be operable to interface with a single type of communication component, but provide those signals to a common signal processor 1108. In embodiment A translation module 1120 may be operable to translate the received or sent signals into a common format or from a common format for the signal processor 1108. The translation module thus may make the signals system agnostic for the signal processor 1108, but also allow for use of different and varying communication modules 1104.

The signal processor 1108 may be operable to analyze signal characteristics, relay messages, or do other types of processing for the communication system 1028. A signal processor can receive signal data from the communication modules 1104. This data may include time stamps, signal attenuation characteristics, Doppler shift characteristics, and other types of characteristics about the signal. This data may be then analyzed with the signal processor 1108 to determine the location of the source of the signal. This location determination may then be used to determine whether a user is provided access to the communication system 1028. If access is granted, the address module 1112 may provide an address to the device in order to provide for inter-device communication or communication from the vehicle to the device. The address module 1112 may be a domain name server or other type of addressing system. The signal processor may then also store data about the signal, the device associated with the signal, the user associated with the signal, or other data in a signal data database 1116. The database 1116 may be any type of data structure or data-stored system, for example, an object-oriented database, file-file database, or other types of databases. This data may include any data receiver processed by the signal processor and used to identify the source location of the signals. This information may be access-stored or managed by the signal processor 1108. The signals received by the signal processor may be sent from or sent to the processor in the vehicle control system.

Figure 12A:
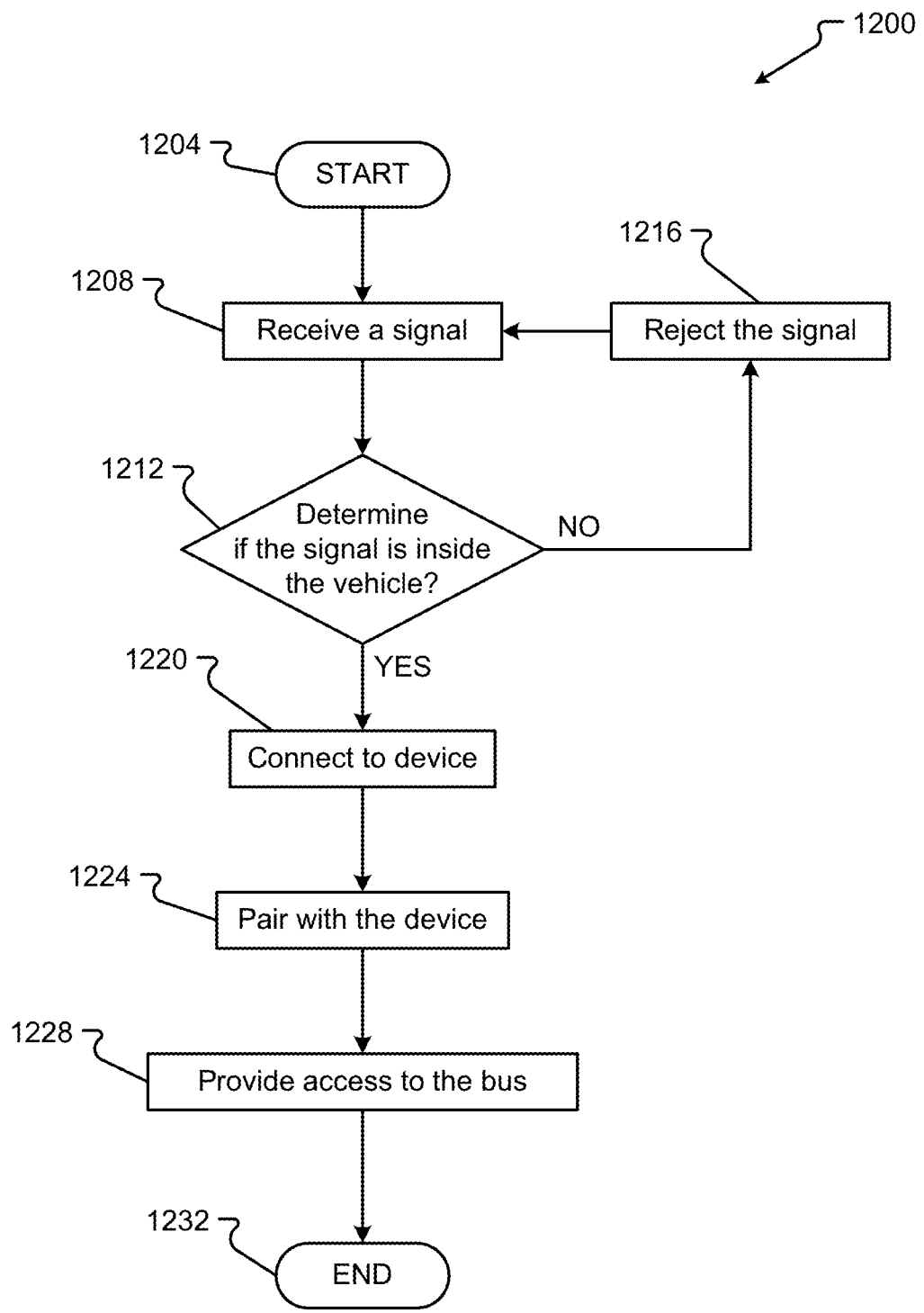
FIG. 12A is a flow diagram of a method for creating a universal bus.
Figure 12B:
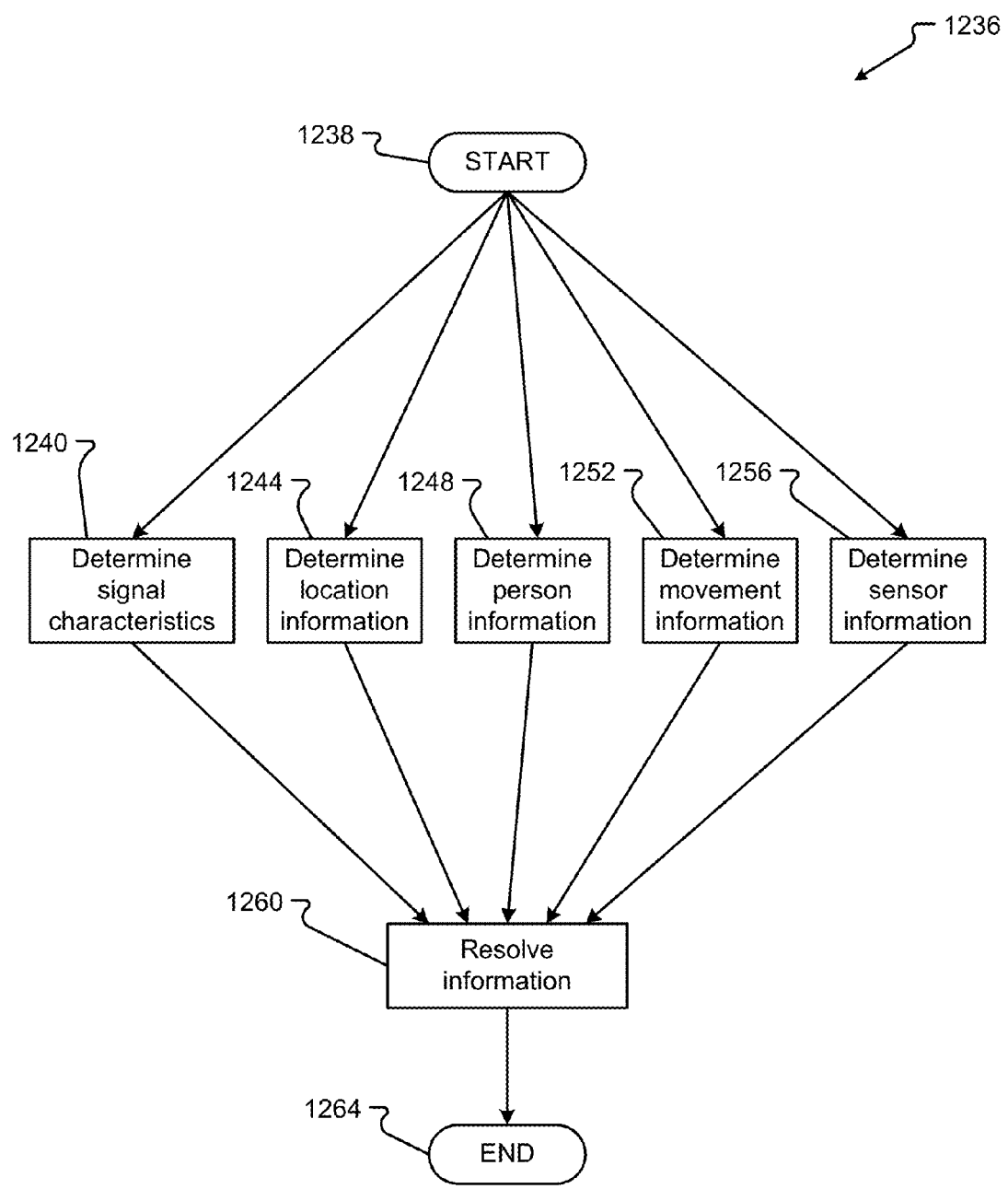
FIG. 12B is a flow diagram of a method for determining a signal originates inside a vehicle.

An embodiment of a method 1200 for storing gestures associated with the user is shown in FIGS. 12A and 12B. While a general order for the steps of the method 1200 is shown in FIGS. 12A and 12B. Generally, the method 1200 starts with a start operation 1204 and ends with an end operation 1240. The method 1200 can include more or fewer steps or can arrange the order of the steps differently than those shown in FIGS. 12A and 12B. The method 1200 can be executed as a set of computer-executable instructions executed by a computer system and encoded or stored on a computer readable medium. Hereinafter, the method 1200 shall be explained with reference to the systems, components, modules, software, data structures, user interfaces, etc. described in conjunction with FIGS. 1-11.

The communication system 1028 may receive a signal from a device, in step 1208. The signal can be received by one of the receivers 904, which may include a bluetooth transceiver 1000 for an 802.11 transceiver 1012 or some other receiver. The signal may then be transferred to the communications system 1028.

In step 1212, the communication system 1028 may determine if the signal has been originating inside the vehicle. Various analyses may be done on the signal information contained in the signal. Some of this analysis may be as described in conjunction with FIG. 12B. If the signal is determined to originate outside the vehicle, the method 1200 may proceed now to step 1216 where the communications system 1028 will reject the receipt of the signal. If the signal is determined to have originated from inside the vehicle, the communication system 1028 may make a connection to the device 1000A, in step 1220.

The connection may be established in step 1220 by pairing the device 1008 with bluetooth system 1004, may establish the IP address or other type of access such that signals coming from the device thereinafter are not rejected, or other types of wireless or wire connection may be made. Embodiments if it is a bluetooth connection, the communication system 1028 can pair the device 1008 with a bluetooth transceiver 1004, in step 1224. The communication system 1028 may make several pairings as there may be two or more bluetooth transceivers available. Upon making the connection or pairing, the communication system 1028 can provide access to the communication bus 1228 such that signals to and from devices are to and from the processor 504 of the vehicle control system may be accessed by the device sending the signals. In this way a communication bus is wirelessly or established through wired connections.

Embodiment of analysis used to determine whether a signal originates inside a vehicle is shown in FIG. 12B. The signal processor 1108 of the communication system 1028 may analyze signal characteristics in step 1240. Signal characteristics can include such things as signal attenuation where a signal with a shrinking strength or increasing strength may be determined to be moving in relative proximity or position to the vehicle 104. Other signal characteristic analysis may include determining if there is any Doppler shift in the frequency, which may indicate movement in reference to the vehicle 104. Further, the signal characteristic analysis may also determine any kind of delay between receiving the same signal at the various transceivers 904A through 904D. A difference in the time can be used to triangulate where the location of the signal originated and if that location is outside the vehicle or inside the vehicle.

The signal processor 1108 can also analyze location information. Beyond the signal characteristic location information, the signal processor 1108 may receive information from sensors 242 to determine a location of the vehicle. If the location is in an area where there is not a likelihood of signal congestion, for example in the driveway of someone's home, then all received signals may be determined to have been with inside the vehicle. Thus, as signals are received if the location has changed it may be determined whether or not this location is an area where there may be more signals received that would be outside the vehicle.

Analysis of the person sending the signal may also be used. Thus, the signal processor 1108 may access signal data 1116 to determine if signals have been received from this device or from this person before. Thus, the signal may identify a person inside signal data 1116 and the signal processor 1108 may determine if that person has used or connected with the signal processor 1108 previously. Further, the signal processor 1108 can determine if there is movement of the vehicle. If a signal remains with the car, the vehicle moves, then that signal can be determined to be inside the vehicle. For example, if the signal is received at the beginning of a route and then after some time thereinafter the signal continues to be received, then it is determined that signal may be inside the vehicle.

Further sensor data may be analyzed in step 1256. Sensor data may include such things as determining if there are people and the number of people within a car. Thus, if there are three people in the vehicle 104 and three signals are received, all three signals may be determined to be inside the vehicle. Further, it may be possible for the sensors to determine if a device is currently being used inside the vehicle. For example, if an optical sensor can view a device within its field of vision, if an electromagnetic field sensor determines that there is EMF radiation emanating from a location in the vehicle, then the signal processor 1108 can determine that that signal is originating inside a vehicle 104.

The signal processor 1108 may receive one or more of these analyses from and resolve that information in step 1260. Thus, the signal processor 1108 can cross-correlate information from different analyses to determine if the signal is within the vehicle. In this way a more robust decision is made as to whether or not the signal originates in the vehicle and should be allowed to connect to the bus or the universal hot spot routing system of the vehicle.

Figure 13:
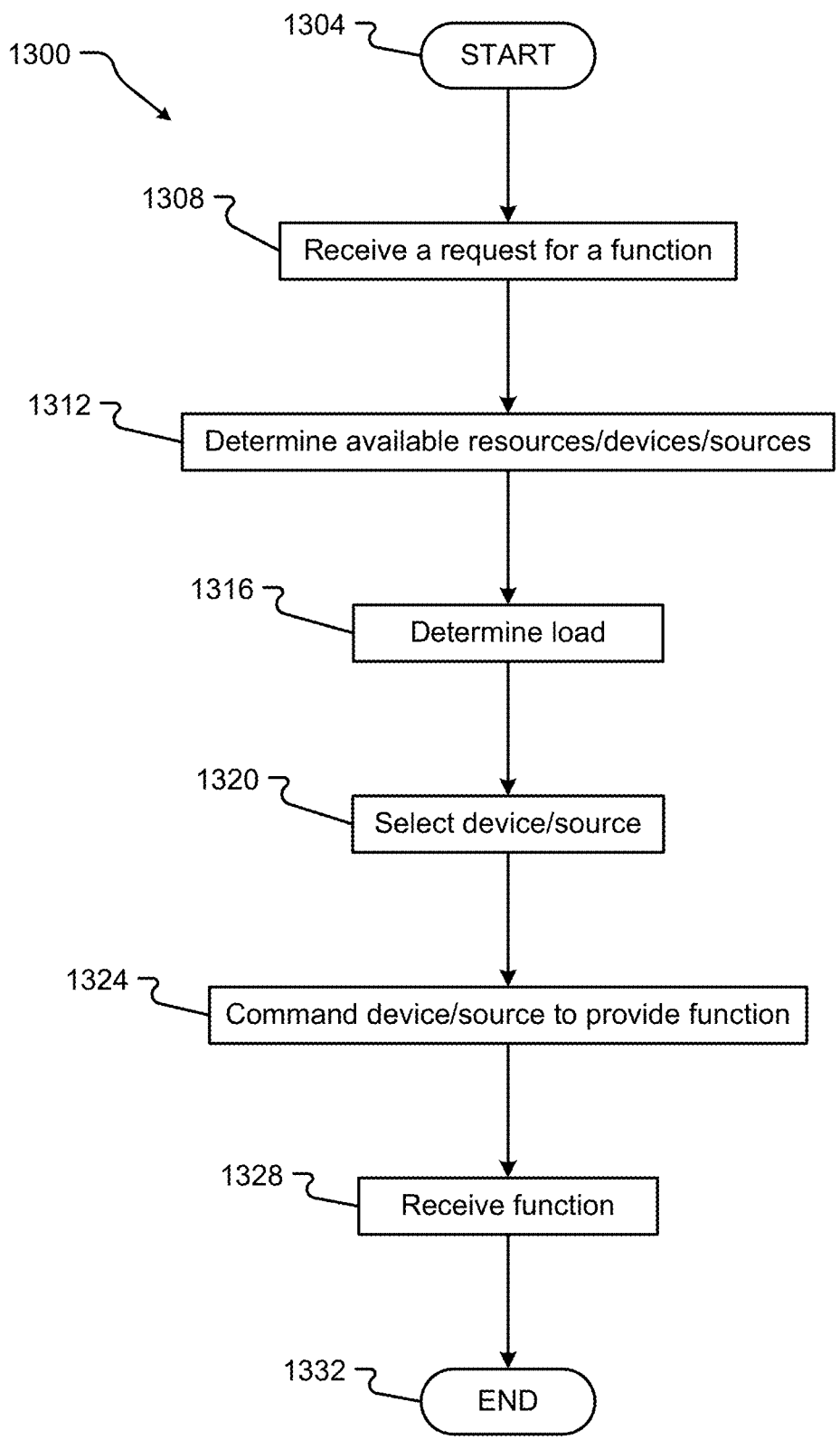
FIG. 13 is a flow diagram of a method for providing a network hot spot.

An embodiment of a method 1300 for receiving a gesture and configuring the vehicle 104 based on the gesture may be as provided in FIG. 13. While a general order for the steps of the method 1300 is shown in FIG. 13. Generally, the method 1300 starts with a start operation 1304 and ends with an end operation 1328. The method 1300 can include more or fewer steps or can arrange the order of the steps differently than those shown in FIG. 13. The method 1300 can be executed as a set of computer-executable instructions executed by a computer system and encoded or stored on a computer readable medium. Hereinafter, the method 1300 shall be explained with reference to the systems, components, modules, software, data structures, user interfaces, etc. described in conjunction with FIGS. 1-12.

A user using a device 1008 may request the function, instead of 1308. The function can be any type of function that may be offered by the vehicle such as the playing of multimedia data, provision of access to the internet, e-mail, or other types of functions. The request may be received by the communication system 1028 and processed by the signal processor 1108.

The signal processor 1108 may then determine the available devices or sources for the function, in step 1312. For example, the signal processor can determine if one of the devices already connected within the communication system can provide the function. For example, if the function is the provision of multimedia stream, one of the other devices 1008 within the vehicle 104 may be able to connect to a source to provide the multimedia stream. Embodiments of the automobile itself may provide it through some wireless communication module 532. As such, the signal processor may determine to use what available resources there are to provide the function to the requestor.

The signal processor 1108 may also determine the load on each of the devices, in step 1316. Thus, not only will the signal processor 1108 look for an available source, but will also look for a source that has the least amount of load. The load balancing may be either determined by the number of input/output messages sent between a source or device and the signal processor, may be determined by information sent to the signal processor 1108, or by some other means.

Based on the available sources and the load, the signal processor 1108 can determine a device or source to select for the function, in step 1320. Upon selecting the device or source, the signal processor 1108 can send a command or directive to the device or source in step 1324, to provide the function. The device or source may then provide the function and the requesting device may receive that function, in step 1328.

Figure 14:
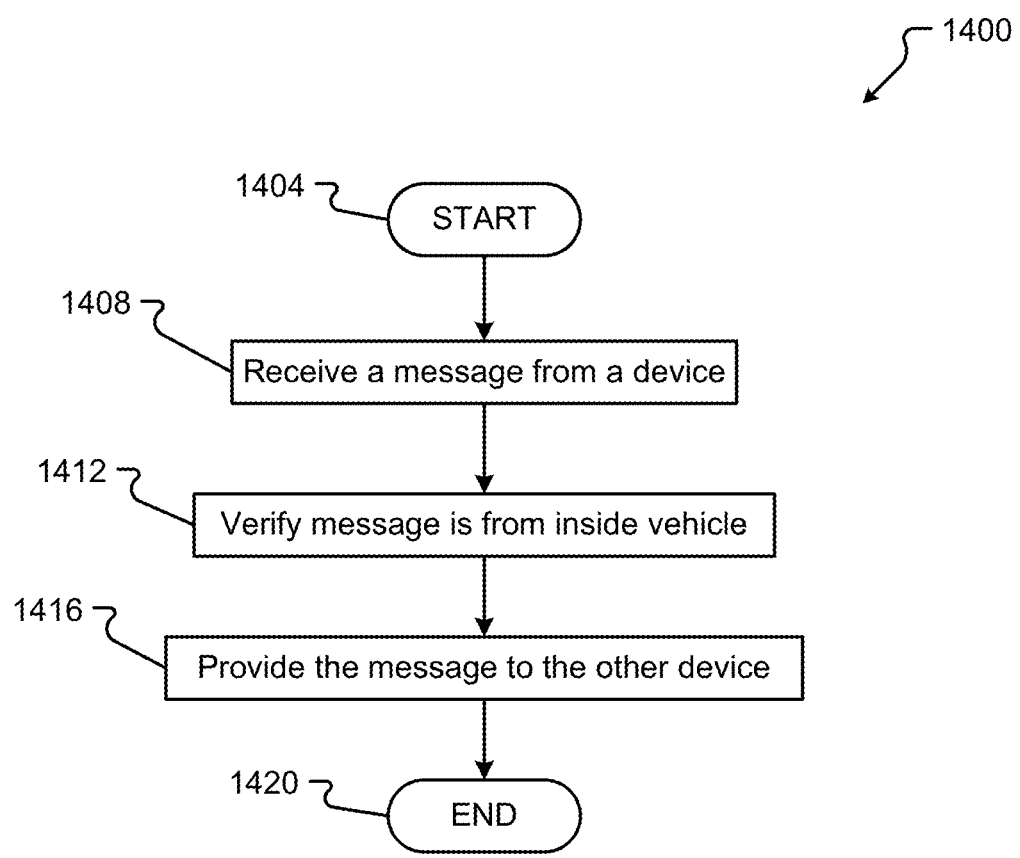
FIG. 14 is a flow diagram of a method for communicating between devices.

An embodiment of a method 1400 for storing health data may be as shown in FIG. 14. While a general order for the steps of the method 1400 is shown in FIG. 14. Generally, the method 1400 starts with a start operation 1404 and ends with an end operation 1444. The method 1400 can include more or fewer steps or can arrange the order of the steps differently than those shown in FIG. 14. The method 1400 can be executed as a set of computer-executable instructions executed by a computer system and encoded or stored on a computer readable medium. Hereinafter, the method 1400 shall be explained with reference to the systems, components, modules, software, data structures, user interfaces, etc. described in conjunction with FIGS. 1-13.

An embodiment of method 1400 for communication between devices inside a vehicle 104 is shown in FIG. 14. While a general order for the steps of the method 1400 is shown in FIG. 14. Generally, the method 1400 starts with a start operation 1404 and ends with an end operation 1424. The method 1400 can include more or fewer steps or can arrange the order of the steps differently than those shown in FIG. 14. The method 1400 can be executed as a set of computer-executable instructions executed by a computer system and encoded or stored on a computer readable medium. Hereinafter, the method 1400 shall be explained with reference to the systems, components, modules, software, data structures, user interfaces, etc. described in conjunction with FIGS. 1-13.

A communication system 1028 may receive a message 1408 from a device 1008. This message may be directed to another device within the vehicle 104. Thus, the communication system may access signal data 1116 or address information from an address module 1112 to determine an address or location report for the receiving device 1008. This information may be used also to verify that the message is from a device inside the vehicle 104, in step 1412. Thus, the address or other information from the sender may be used to verify the message is authentic. If the message is verified, the communication system 1028 may provide the message to the recipient address in step 1416. As such, rather than devices communicating directly between each other, the devices 1008 within the vehicle 104 may use the communication system 1028 to relay devices between each other. In this way, the universal bus for the devices is used as a communication system that is more secure and contained within the vehicle.

Figure 15:
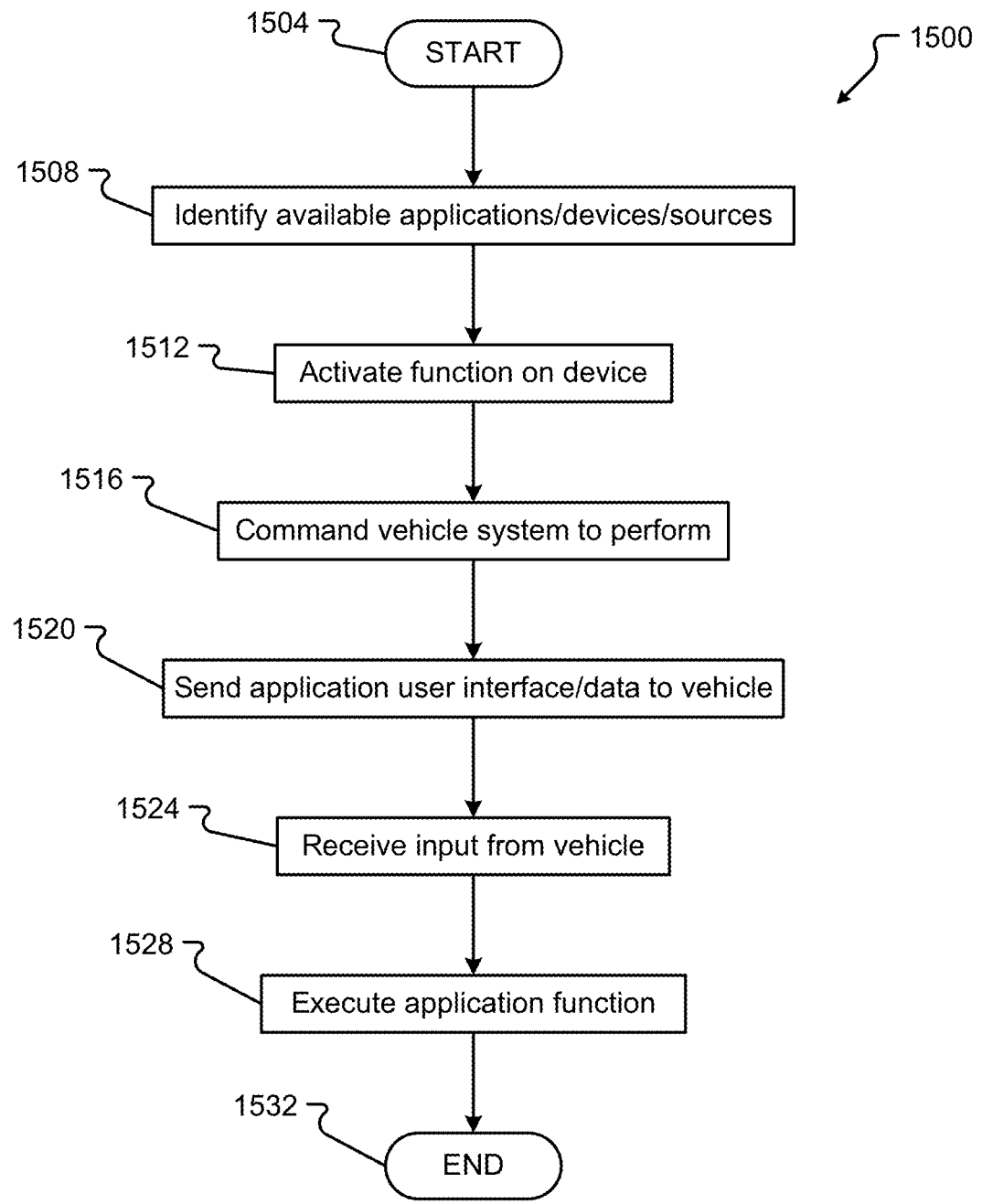
FIG. 15 is a flow diagram of a method for sharing an application from a device.

An embodiment of a method 1500 for monitoring the health of a user may be as shown in FIG. 15. While a general order for the steps of the method 1500 is shown in FIG. 15. Generally, the method 1500 starts with a start operation 1504 and ends with an end operation 1524. The method 1500 can include more or fewer steps or can arrange the order of the steps differently than those shown in FIG. 15. The method 1500 can be executed as a set of computer-executable instructions executed by a computer system and encoded or stored on a computer readable medium. Hereinafter, the method 1500 shall be explained with reference to the systems, components, modules, software, data structures, user interfaces, etc. described in conjunction with FIGS. 1-14.

An embodiment of sharing an application between a device and the vehicle system is shown in FIG. 15. The processor 504 might identify available app sources or devices in step 1508. The available application source or devices may be determined by sending requests through the communication system 1028 to devices 1008. The response may be provided back to the processor 504, which may then identify those apps, sources, and devices to a user through a user touch sensitive display 568. An interaction with the touch sensitive display 568 may then activate the function on a device, in step 1512. Thus, the processor 504 can receive the selection of a function or application in the touch sensitive display 568. Based on this selection, the processor may determine which function was activated based on what was displayed in the touch sensitive display 568.

The processor 504 may then send that selection to a device 1008. Upon receiving the selection, the device 1008 may then execute the application or function and command the vehicle system to perform the display of information based on the function, in step 516. Thus, the processing of the function or application occurs in the device 1008, but is displayed in the touch sensitive display 568. Thus, the device 1008 sends application, user interface information, or data to the vehicle system 504, in step 1520. The processor 504 may receive the input from the device 1008 in step 1524. Any command or information sent to the processor 504 may then be executed as an application function on the touch sensitive display 568 or other display within the vehicle, in step 1528. In this way, the device 1008 actually executes the application while the vehicle displays the user interface information. The execution of the application appears to occur in the vehicle system, but the processing does not actually occur in the vehicle processor 504.

Figure 16:
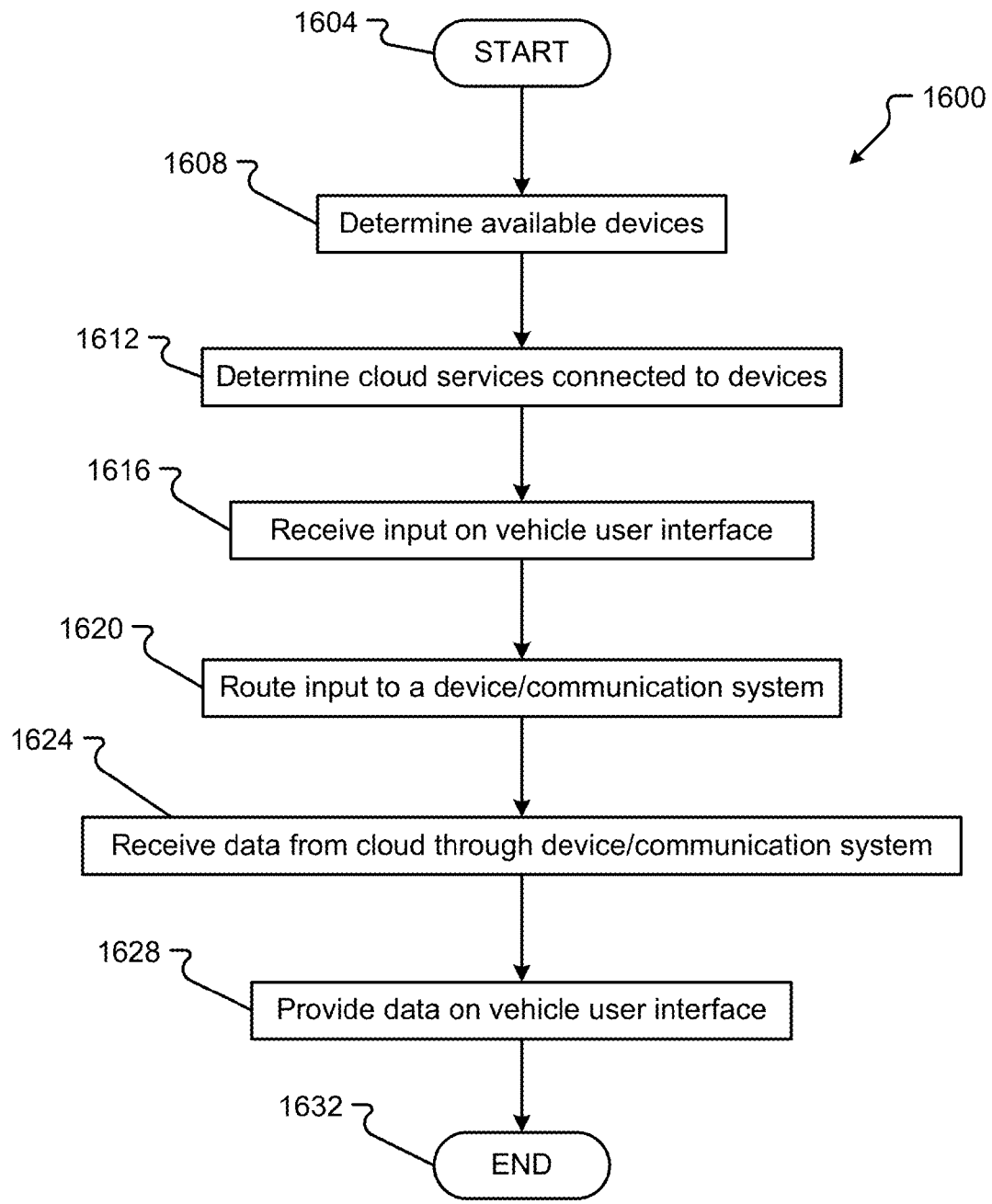
FIG. 16 is a flow diagram of a method for managing data stored in the cloud.

An embodiment of a method 1600 for providing data or functions through cloud-based storage or applications is shown in FIG. 16. While a general order for the steps of the method 1600 is shown in FIG. 16. Generally, the method 1600 starts with a start operation 1604 and ends with an end operation 1624. The method 1600 can include more or fewer steps or can arrange the order of the steps differently than those shown in FIG. 16. The method 1600 can be executed as a set of computer-executable instructions executed by a computer system and encoded or stored on a computer readable medium. Hereinafter, the method 1600 shall be explained with reference to the systems, components, modules, software, data structures, user interfaces, etc. described in conjunction with FIGS. 1-15.

Processor 504 can determine the devices connected to the communication system 1028, in step 1608. Here the communication system 1028 may end information to the processor 508 from signal data 1116. This data may be sent to the processor from signal processor 1108 and contain the number of devices currently connected to the communication system 1028. The processor 504 may also determine cloud sources for applications or data, in step 1612. Here the signal processor 1108 may determine connections from devices 1008 to cloud sources. Further, the processor may determine from the user's available user access what cloud sources are available through server 228. This cloud source information may then be presented in a user interface in the touch sensitive display.

From this touch sensitive display, the processor 504 can receive an input on the vehicle user interface, in step 1616. The input may be a selection of a cloud source for an application or for data. This selection may be analyzed to determine the correct source for that cloud information. Thus, the processor may send a command to the signal processor 1108 to route the input to the appropriate device 1008 or to the server 228 that can provide that cloud source, in 1620. Thus, the processor 504 can leverage the access of other devices 1008 to obtain cloud data. In some embodiments, the cloud source may be provided from two or more different devices 1008 or from a device 1008 and the server 228. In this way, one of the devices 1008 or the server 228 may be selected based on load-balancing principles.

The data may be received from the device 1008 or the server 228 from the cloud and provided to the signal processor 1108, in step 1624. In embodiments, the information may be received from two or more sources and one source cached so that seamless transition between the sources may occur should one of the sources become unavailable unexpectedly. The data received from the cloud source may then be provided to the vehicle touch sensitive display, in 1628. In this way, cloud sources may be leveraged by the vehicle, although the access to those cloud sources may be from device 1008.

Figure 17:
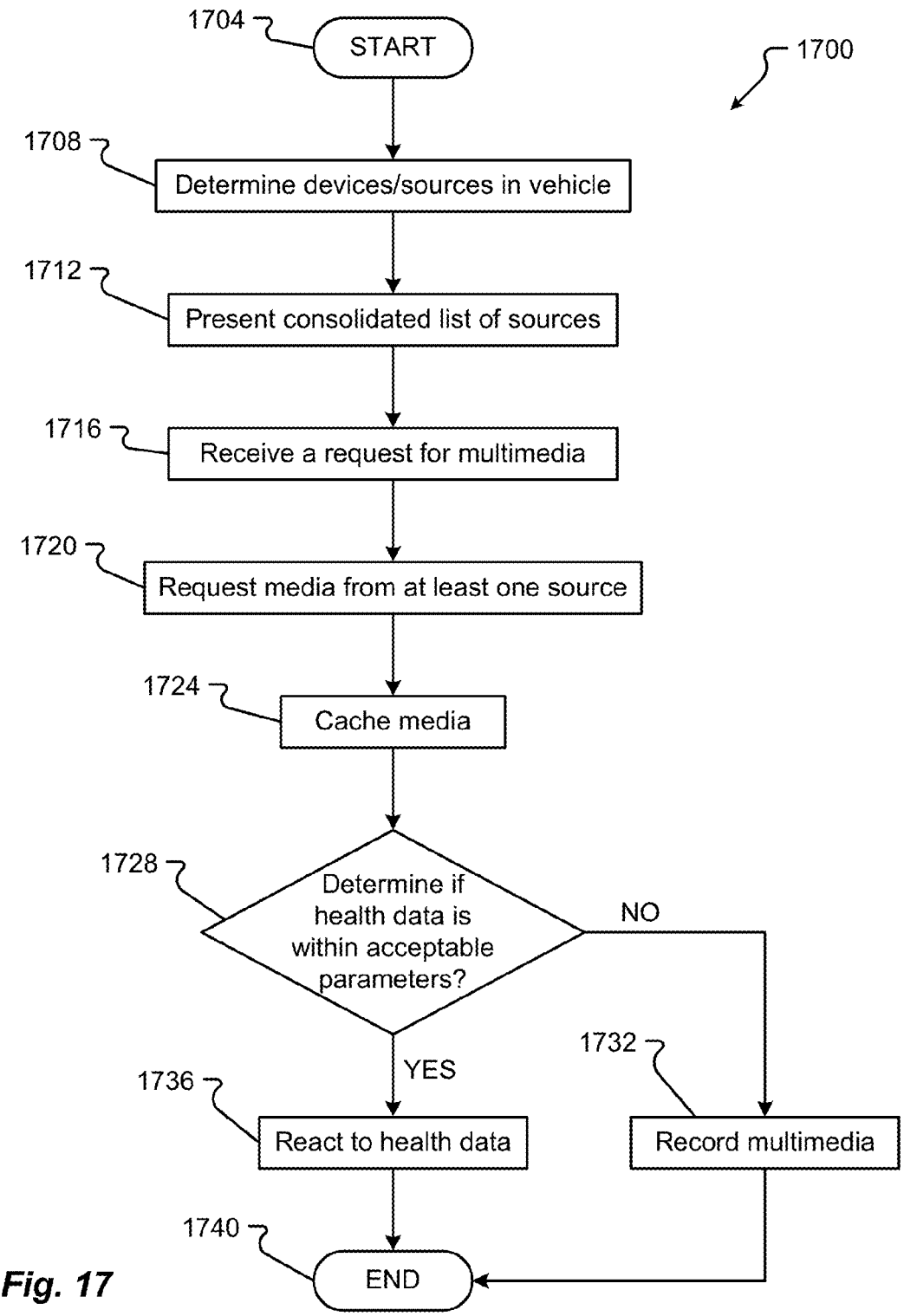
FIG. 17 is a flow diagram of a method for steaming media in a vehicle.

A method 1700 for streaming multimedia data is shown in FIG. 17. While a general order for the steps of the method 1700 is shown in FIG. 17. Generally, the method 1700 starts with a start operation 1704 and ends with an end operation 1724. The method 1700 can include more or fewer steps or can arrange the order of the steps differently than those shown in FIG. 17. The method 1700 can be executed as a set of computer-executable instructions executed by a computer system and encoded or stored on a computer readable medium. Hereinafter, the method 1700 shall be explained with reference to the systems, components, modules, software, data structures, user interfaces, etc. described in conjunction with FIGS. 1-16.

A signal processor 1108 can determine devices or sources from multimedia data in step 1708. The determination may be made by canvassing the different devices 1008 or the server 228 for information about multimedia data. This information may be consolidated and presented on the vehicle touch sensitive display, in step 1712. Thus, the user may select from a multimedia selection or source in its consolidated form from the user interface.

The user may select from the vehicle user interface a request for multimedia, in step 1760. The user touch sensitive display can receive the request and send the request to the processor 504. The processor can determine the source for the multimedia selected and request that media from that source, in step 1720. In embodiments the processor 504 may request the multimedia from two or more sources. The request can be sent from the processor 504 to the signal processor 1108. There the signal processor 1108 can send the request to the device 1008 or to the server 224.

The multimedia received from the source may be cached, in step 1724. Thus, if multimedia is being perceived from two or more sources each source may be cached. One of the sources may be used to present it to the user while the other remains cached. In this way, a fail-safe or fail-over may be provided should one of the sources no longer provide data or some malfunction may occur.

The processor may then determine if safety parameters are met in step 1728. Thus, the provision of certain types of multimedia data, for example video data, may not be met during certain vehicle operations or to certain passengers within the vehicle. For example, a driver cannot watch a movie while driving. Thus, the processor 504 can determine if the safety parameters for the particular person desiring the multimedia data are met. If those safety parameters are not met, the method 1700 proceeds now to step 1732. In step 1732, the processor 504 may record the data to local storage. Thus, the data may be provided at a later time from this local storage. Likewise, the processor 504 can send a signal to another data storage element that can record the data. Thus, the processor 504 can coordinate the recording of the data for the user in a different source that allows the user to view it after they are done operating the vehicle.

If the safety parameters are met, the method 1700 proceeds yes to step 1736. Here the data may then be presented in the vehicle to a user interface. This user interface may provide video data, internet data, audio data, or other types of data. Embodiments the presentation of the data may happen in one or more locations within the vehicle and one or more user interfaces.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a tablet-like device, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The embodiments can include a method, comprising: automatically determining a person is within a vehicle; automatically identifying the person; determining if there is a setting to be stored for the person; and storing the setting. The method further comprises determining if the person can be identified; and, if the person cannot be identified, characterizing the person. Automatically determining a person is within a vehicle can comprise receiving sensor data from at least one sensor that indicates the person is within the vehicle. Also, automatically identifying the person comprises comparing the sensor data to feature data in a data structure; and determining if the sensor data is substantially similar to the feature data, wherein determining if there is a setting to be stored for the person comprises determining if the person has made a setting, and wherein determining if there is a setting to be stored for the person further comprises waiting a period of time to determine if the settings have achieved a steady state. The setting can be stored in cloud storage. The setting can be one or more of, but is not limited to, a position of a seat, a position of a mirror, a heat or cold setting, a configuration of a console, a configuration of a dash, a configuration of a heads up display, or a setting for a radio. The person in the vehicle can occupy an area or zone within the vehicle, and wherein the setting is associated with the person in the area or zone.

Embodiments can further include: a vehicle system, comprising one or more sensors and a vehicle control system. The vehicle control system can comprise a processor and a memory, wherein the processor is operable to: receive sensor data from the one or more sensors; based on the sensor data, automatically determine a person is within a vehicle; based on the sensor data, automatically identify the person; determine if the person has made a setting; and store the setting. The sensor data may be an image of the person and the processor can match the image to a stored image in a data structure. The sensor data can also be voice data from the person and the processor is operable to match the voice data to stored voice data in a data structure.

Embodiments may further include a computer readable medium having stored thereon computer-executable instructions, the computer-executable instructions comprising: instructions to receive sensor data from the one or more sensors; based on the sensor data, instructions to automatically determine a person is within a vehicle; based on the sensor data, instructions to automatically identify the person; instructions to retrieve one or more settings associated with the identified person; and instructions to automatically configure the vehicle according to the retrieved settings. Automatically determining the person is within a vehicle can comprise instructions to determine an area or zone in which the person occupies, wherein the settings retrieved are associated with the determined area or zone, wherein the settings are retrieved from a data structure, and wherein the data structure is stored in cloud storage.

The embodiments can include a method, comprising: automatically determining a person is within a vehicle; automatically identifying the person; determining if there is a gesture to be stored for the person; and storing the gesture. The method further comprises determining if the person can be identified; and, if the person cannot be identified, characterizing the person. Automatically determining a person is within a vehicle can comprise receiving sensor data from at least one sensor that indicates the person is within the vehicle. Also, automatically identifying the person comprises comparing the sensor data to feature data in a data structure; and determining if the sensor data is substantially similar to the feature data, wherein determining if there is a gesture to be stored for the person comprises determining if the person has created a gesture, and wherein determining if there is a gesture to be stored for the person further comprises receiving an indication from the person that a gesture is to be created. The gesture can be stored in cloud storage. The gesture can be one or more of, but is not limited to a gesture in a gesture capture region, a gesture in a touch sensitive display, or a movement in a three-dimensional space. The person in the vehicle can occupy an area or zone within the vehicle, and wherein the gesture is associated with the person in the area or zone.

Embodiments can further include: a vehicle system, comprising one or more sensors and a vehicle control system. The vehicle control system can comprise a processor and a memory, wherein the processor is operable to: receive sensor data from the one or more sensors; based on the sensor data, automatically determine a person is within a vehicle; based on the sensor data, automatically identify the person; determine if the person has made a gesture; and store the gesture. The sensor data may be an image of the person and the processor can match the image to a stored image in a data structure. The sensor data can also be voice data from the person and the processor is operable to match the voice data to stored voice data in a data structure.

Embodiments may further include a computer readable medium having stored thereon computer-executable instructions, the computer-executable instructions comprising: instructions to receive sensor data from the one or more sensors; based on the sensor data, instructions to automatically determine a person is within a vehicle; based on the sensor data, instructions to automatically identify the person; instructions to retrieve one or more gestures associated with the identified person; instructions to receive a gesture; and instructions to automatically configure the vehicle according to the received gesture. Automatically determining the person is within a vehicle can comprise instructions to determine an area or zone in which the person occupies, wherein the gestures retrieved are associated with the determined area or zone, wherein the gestures are retrieved from a data structure, and wherein the data structure is stored in cloud storage.

What is claimed is:

1. A method, comprising:
 separating, by a processor, a vehicle into one or more zones;
 automatically determining, by the processor, a person is within a zone of the one or more zones of the vehicle;
 automatically identifying, by the processor, the person within the zone of the vehicle in response to determining that a person is within the zone of the one or more zones of the vehicle;
 automatically identifying, by the processor, the zone that the identified person is within;
 referring, by the processor, to a data structure associated with the identified person in response to identifying the person, wherein the data structure stores at least one set of gestures for the identified person, wherein each gesture in the at least one set of gestures is associated with a control of a vehicle function, and wherein the control of the vehicle function depends on the identified zone;
 determining, by the processor, whether a gesture is provided by the identified person within the identified zone, wherein the gesture is included in the at least one set of gestures; and
 controlling, by the processor, when the gesture is provided by the identified person, the vehicle function based on the gesture provided and the identified zone.

2. The method of claim 1, wherein each gesture in the at least one set of gestures is determined or created by the person prior to being stored in the data structure.

3. The method of claim 1, wherein each gesture in the at least one set of gestures is one of a gesture in a gesture capture region, a gesture in a touch sensitive display, or a movement in a three-dimensional space.

4. The method of claim 1, wherein the data structure is configured to store a first set of gestures for the identified person in a first zone of the vehicle and a different second set of gestures for the identified person in a different second zone of the vehicle.

5. The method of claim 4, wherein the first set of gestures is shared between users when each user is identified within the first zone of the vehicle.

6. The method of claim 1, wherein the data structure is configured to store a first gesture in the at least one set of gestures that is configured to provide a first vehicle function control when the person is identified in a first zone of the vehicle, and wherein the first gesture is configured to provide a different second vehicle function control when the person is identified in a different second zone of the vehicle.

7. The method of claim 6, wherein the first zone of the vehicle is associated with a driving position in the vehicle for the identified person, and wherein the second zone of the vehicle is associated with a passenger position in the vehicle for the identified person.

8. A vehicle system, comprising:
 one or more sensors;
 a vehicle control system associated with a vehicle comprising:
  a processor;
  a memory;
  wherein the processor:
   separates the vehicle into one or more zones;
   receives sensor data from the one or more sensors;
   based on the sensor data, automatically determines a person is within a zone of the one or more zones of the vehicle;
   based on the sensor data and determining that a person is within the vehicle, automatically identifies the person within the zone of the vehicle;
   based on the sensor data, automatically determines the zone that the identified person is within;
   refers to a data structure associated with the identified person in response to identifying the person, wherein the data structure stores at least one set of gestures for the identified person, wherein each gesture in the at least one set of gestures is associated with a control of a vehicle function, and wherein the control of the vehicle function depends on the identified zone;
   determines whether a gesture is provided by the identified person within the identified zone, wherein the gesture is included in the at least one set of gestures; and controls, when the gesture is provided by the identified person, the vehicle function based on the gesture provided and the identified zone.

9. The system of claim 8, wherein each gesture in the at least one set of gestures is determined or created by the person prior to being stored in the data structure.

10. The system of claim 8, wherein each gesture in the at least one set of gestures is one of a gesture in a gesture capture region, a gesture in a touch sensitive display, or a movement in a three-dimensional space.

11. The system of claim 8, wherein the data structure is configured to store a first set of gestures for the identified person in a first zone of the vehicle and a different second set of gestures for the identified person in a different second zone of the vehicle.

12. The system of claim 11, wherein the first set of gestures is shared between users when each user is identified within the first zone of the vehicle.

13. The system of claim 8, wherein the data structure is configured to store a first gesture in the at least one set of gestures that is configured to provide a first vehicle function control when the person is identified in a first zone of the vehicle, and wherein the first gesture is configured to provide a different second vehicle function control when the person is identified in a different second zone of the vehicle.

14. The system of claim 13, wherein the first zone of the vehicle is associated with a driving position in the vehicle for the identified person, and wherein the second zone of the vehicle is associated with a passenger position in the vehicle for the identified person.

15. The system of claim 8, wherein a mobile device associated with the identified person includes the data structure.

16. A non-transitory computer readable medium having stored thereon computer-executable instructions, the computer-executable instructions causing a processor to execute a method, the computer-executable instructions comprising:
   instructions to separate a vehicle into one or more zones;
   instructions to receive sensor data from the one or more sensors;
   based on the sensor data, automatically determine a person is within a zone of the one or more zones of the vehicle;
   based on the sensor data and determining that a person is within the vehicle, automatically identify the person within the zone of the vehicle;
   based on the sensor data, automatically determine the zone that the identified person is within;
   instructions to refer to a data structure associated with the identified person in response to identifying the person, wherein the data structure is configured to store at least one set of gestures for the identified person, wherein each gesture in the at least one set of gestures is associated with a control of a vehicle function, and wherein the control of the vehicle function depends on the identified zone;
   instructions to determine whether a gesture is provided by the identified person within the identified zone, wherein the gesture is included in the at least one set of gestures; and
   instruction to control, when the gesture is provided by the identified person, the vehicle function based on the gesture provided and the identified zone.

17. The non-transitory computer readable medium of claim 16, wherein each gesture in the at least one set of gestures is determined or created by the person prior to being stored in the data structure.

18. The non-transitory computer readable medium of claim 16, wherein each gesture in the at least one set of gestures is one of a gesture in a gesture capture region, a gesture in a touch sensitive display, or a movement in a three-dimensional space.

19. The non-transitory computer readable medium of claim 16, wherein the data structure is configured to store a first set of gestures for the identified person in a first zone of the vehicle and a different second set of gestures for the identified person in a different second zone of the vehicle.

20. The non-transitory computer readable medium of claim 19, wherein the first set of gestures is shared between users when each user is identified within the first zone of the vehicle.

* * * * *